US008215017B2

(12) United States Patent
Hayashi

(10) Patent No.: US 8,215,017 B2
(45) Date of Patent: Jul. 10, 2012

(54) METHOD OF MANUFACTURING LIQUID EJECTION HEAD, METHOD OF MANUFACTURING RECORDING APPARATUS INCLUDING THE SAME, LIQUID EJECTION HEAD, AND RECORDING APPARATUS

(75) Inventor: Hideki Hayashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 290 days.

(21) Appl. No.: 12/715,876

(22) Filed: Mar. 2, 2010

(65) Prior Publication Data

US 2010/0220150 A1 Sep. 2, 2010

(30) Foreign Application Priority Data

Mar. 2, 2009 (JP) ................................ 2009-048512

(51) Int. Cl.
*B23P 17/00* (2006.01)

(52) U.S. Cl. ............................ 29/890.1; 347/49; 347/68

(58) Field of Classification Search .................... 347/40, 347/43, 68, 64, 65; 29/890.1
See application file for complete search history.

(56) References Cited

U.S. PATENT DOCUMENTS 7,281,330 B2 * 10/2007 Silverbrook et al. ........ 29/890.1
7,370,415 B2 * 5/2008 Kikugawa et al. ........... 29/890.1
2005/0248627 A1 11/2005 Ito et al.
2006/0221112 A1 10/2006 Ito
2008/0211851 A1 9/2008 Murashima

FOREIGN PATENT DOCUMENTS

JP H08-118619 A 5/1996
JP 2001-038892 A 2/2001
JP 2005-319645 A 11/2005
JP 2006-068664 A 3/2006
JP 2006-272909 A 10/2006
JP 2007-301904 A 11/2007
JP 2008-074041 A 4/2008
JP 2008-221735 A 9/2008

* cited by examiner

*Primary Examiner* — Lamson Nguyen
(74) *Attorney, Agent, or Firm* — Baker Botts L.L.P.

(57) ABSTRACT

A method of manufacturing a liquid ejection head having a plurality of passage modules that have individual passages, a plurality of actuator modules that each include a plurality of actuators, and a drive unit, and the liquid ejection head produced by the method. The method comprising ranking the passage modules based on a magnitude of a passage resistance of the individual passages, ranking the actuator modules based on a magnitude of a capacitance of the actuators, and fixing the actuator modules to the passage modules so that the actuator modules ranked as having a capacitance not less than a predetermined capacitance correspond to the passage modules ranked as having a passage resistance not less than a predetermined passage resistance, and so the actuator modules ranked as having a capacitance less than the predetermined capacitance correspond to passage modules ranked as having a passage resistance less than the predetermined passage resistance.

22 Claims, 14 Drawing Sheets

*FIG. 9*

| | PASSAGE MODULE (PASSAGE RESISTANCE LOW ↔ HIGH) | | | | |
|---|---|---|---|---|---|
| ACTUATOR MODULE (CAPACITANCE HIGH ↔ LOW) | RANK | 1 | 2 | 3 | 4 |
| | 1 | ○ | ○ | × | × |
| | 2 | ○ | ○ | ○ | × |
| | 3 | × | ○ | ○ | ○ |
| | 4 | × | × | ○ | ○ |

METHOD OF MANUFACTURING LIQUID EJECTION HEAD, METHOD OF MANUFACTURING RECORDING APPARATUS INCLUDING THE SAME, LIQUID EJECTION HEAD, AND RECORDING APPARATUS

CROSS REFERENCE TO RELATED APPLICATION

The present application claims priority from Japanese Patent Application No. 2009-048512, which was filed on Mar. 2, 2009, the disclosure of which is incorporated herein by reference in its entirety.

BACKGROUND

The present invention relates to a method of manufacturing a liquid ejection head that ejects a liquid onto a recording medium to form an image, a method of manufacturing a recording apparatus that includes the liquid ejection head, a liquid ejection head, and a recording apparatus.

For example among inkjet heads used in inkjet type recording apparatuses, there are so-called piezo type heads with which an actuator is deformed to apply pressure to ink in a pressure chamber and thereby eject the ink from a nozzle. With the piezo type inkjet head, a driver IC or other drive unit that supplies a drive voltage to the actuator is provided and the drive unit is known to generate heat.

SUMMARY

Also, in a case of using an ink of comparatively high viscosity and low fluidity, use of the heat generated by the related drive unit to raise a temperature of the ink to thereby increase the fluidity of the ink and realize appropriate recording may be considered. However, there is a problem that good quality recording cannot be realized due to ink fluidity differences arising either according to position in one head or according to position of each head in an inkjet type recording apparatus that includes a plurality of heads, or both, as a result of differences in passage configurations of heads, amounts of heat generated at respective drive units, etc.

An object of exemplary embodiments of the present invention is to provide a method of manufacturing a liquid ejection head, a method of manufacturing a recording apparatus that includes the same, a liquid ejection head, and a recording apparatus with which, even in a case of using a liquid of comparatively high viscosity, the liquid can be made uniform in fluidity within a head passage to enable realization of good quality recording.

According to the exemplary embodiments of the present invention, a method of manufacturing a liquid ejection head having:

a plurality of passage modules, each passage module including a plurality of individual passages, each individual passage leading through a pressure chamber to a liquid ejection port that ejects a liquid;

a plurality of actuator modules, each actuator module including a plurality of actuators respectively applying pressure to the liquid in the plurality of pressure chambers in each passage module; and a drive unit, which is thermally coupled to the passage modules and which supplies a drive voltage to the actuator modules corresponding to the passage modules;

the method of manufacturing a liquid ejection head comprises:

ranking the passage modules based on a magnitude of a passage resistance of the individual passages of the respective passage modules;

ranking the actuator modules based on a magnitude of a capacitance of the actuators of the respective actuator modules; and fixing the actuator modules to the passage modules so that the actuator modules that were ranked in the actuator module ranking as actuator modules in which the actuators have a capacitance not less than a predetermined capacitance correspond to the passage modules that were ranked in the passage module ranking as passage modules in which the individual passages have a passage resistance not less than a predetermined passage resistance, and so that the actuator modules that were ranked in the actuator module ranking as actuator modules in which the actuators have a capacitance less than the predetermined capacitance correspond to the passage modules that were ranked in the passage module ranking as passage modules in which the individual passages have a passage resistance less than the predetermined passage resistance.

According to the exemplary embodiments of the present invention, a method of manufacturing a recording apparatus including a plurality of liquid ejection heads, each liquid ejection head having:

- not less than one passage module, each passage module including a plurality of individual passages, each individual passage leading through a pressure chamber to a liquid ejection port that ejects a liquid;
- not less than one actuator module, each actuator module including a plurality of actuators respectively applying pressure to the liquid in the plurality of pressure chambers in the passage module; and
- a drive unit, which is thermally coupled to the passage modules and which supplies a drive voltage to the actuator module corresponding to the passage module;

the method of manufacturing comprises:

ranking the passage modules, in the plurality of liquid ejection heads, based on a magnitude of a passage resistance of the individual passages of the respective passage modules;

ranking the actuator modules based on a magnitude of a capacitance of the actuators of the respective actuator modules; and fixing the actuator modules to the passage modules so that the actuator modules that were ranked in the actuator module ranking step as actuator modules in which the actuators have a capacitance not less than a predetermined capacitance correspond to the passage modules that were ranked in the passage module ranking step as passage modules in which the individual passages have a passage resistance not less than a predetermined passage resistance, and such that the actuator modules ranked in the actuator module ranking step as actuator modules in which the actuators have a capacitance less than the predetermined capacitance, correspond to the passage modules that were ranked in the passage module ranking step as passage modules in which the individual passages have a passage resistance less than the predetermined passage resistance.

According to the exemplary embodiments of the present invention, a liquid ejection head comprises:

a plurality of passage modules, each passage module including a plurality of individual passages, each individual passage leading through a pressure chamber to a liquid ejection port that ejects a liquid;

a plurality of actuator modules, each actuator module including a plurality of actuators respectively applying pressure to the liquid in the plurality of pressure chambers in each passage module; and a drive unit, which is thermally coupled to the passage modules and which supplies a drive voltage to the actuator modules corresponding to the passage modules, wherein the actuator modules are fixed to the passage modules so that the actuator modules having a capacitance not less than a predetermined capacitance, correspond to the passage modules having a passage resistance not less than a predetermined passage resistance, and such that the actuator modules having a capacitance less than the predetermined capacitance correspond to the passage modules having a passage resistance less than the predetermined passage resistance.

According to the exemplary embodiments of the present invention, a recording apparatus comprises:

a plurality of liquid ejection heads, each liquid ejection head comprising:

not less than one passage module, each passage module including a plurality of individual passages, each individual passage leading through a pressure chamber to a liquid ejection port that ejects a liquid;

not less than one actuator module, each actuator module including a plurality of actuators respectively applying pressure to the liquid in the plurality of pressure chambers in the passage module; and a drive unit, which is thermally coupled to the passage modules and, which supplies a drive voltage to the actuator module corresponding to the passage module; and wherein the actuator modules are fixed to the passage modules so that the actuator modules having a capacitance not less than a predetermined capacitance, correspond to the passage modules having a passage resistance not less than a predetermined passage resistance, and such that the actuator modules having a capacitance less than the predetermined capacitance, correspond to the passage modules having a passage resistance less than the predetermined passage resistance.

BRIEF DESCRIPTION OF THE DRAWINGS

FIG. 9 is a table of ranking and correspondence of the passage modules and actuator modules.

DETAILED DESCRIPTION OF EXEMPLARY EMBODIMENTS

Exemplary embodiments of the present invention will now be described with reference to the drawings.

First, an overall configuration of an inkjet printer 1 according to an embodiment of a recording apparatus of the present invention shall be described with reference to FIG. 1. The inkjet printer 1 includes four inkjet heads 10 according to an embodiment of a liquid ejection head of the present invention.

Figure 1:
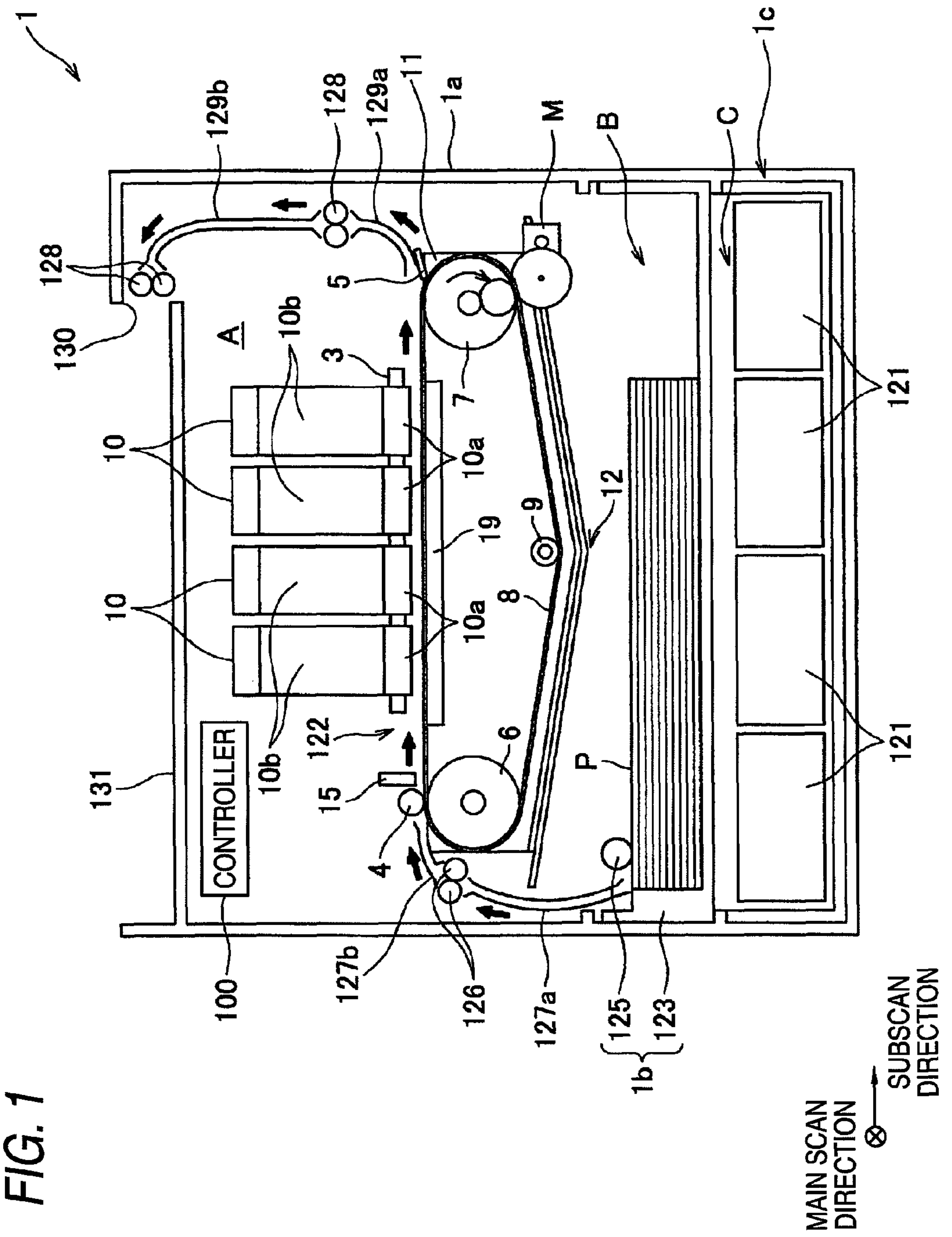
FIG. 1 is a sectional side view of an inkjet printer according to an exemplary embodiment of a recording apparatus of the present invention that includes four inkjet heads according to an exemplary embodiment of a liquid ejection head of the present invention.

As shown in FIG. 1, the inkjet printer 1 includes a casing 1*a* with a rectangular parallelepiped shape. A sheet ejection portion 131, receiving a sheet P on which recording has been performed and which is ejected from an opening 130, is formed at an upper portion of a top panel of the casing 1*a*. An internal space of the casing 1*a* is divided into spaces A, B, and C in that order from an upper side, and four inkjet heads 10 ejecting inks of respective colors of magenta, cyan, yellow, and black, a conveying unit 122 conveying the sheet P, and a controller 100 controlling operations of respective portions of the printer 1 are disposed in the space A. Each head 10 is disposed so that its longitudinal direction lies along a main scan direction, and the conveying unit 122 conveys the sheet P in a subscan direction. The spaces B and C are spaces in which are respectively disposed a sheet supply unit 1*b* and an ink tank unit 1*c* that are detachable from the casing 1*a* along the main scan direction.

Figure 2:
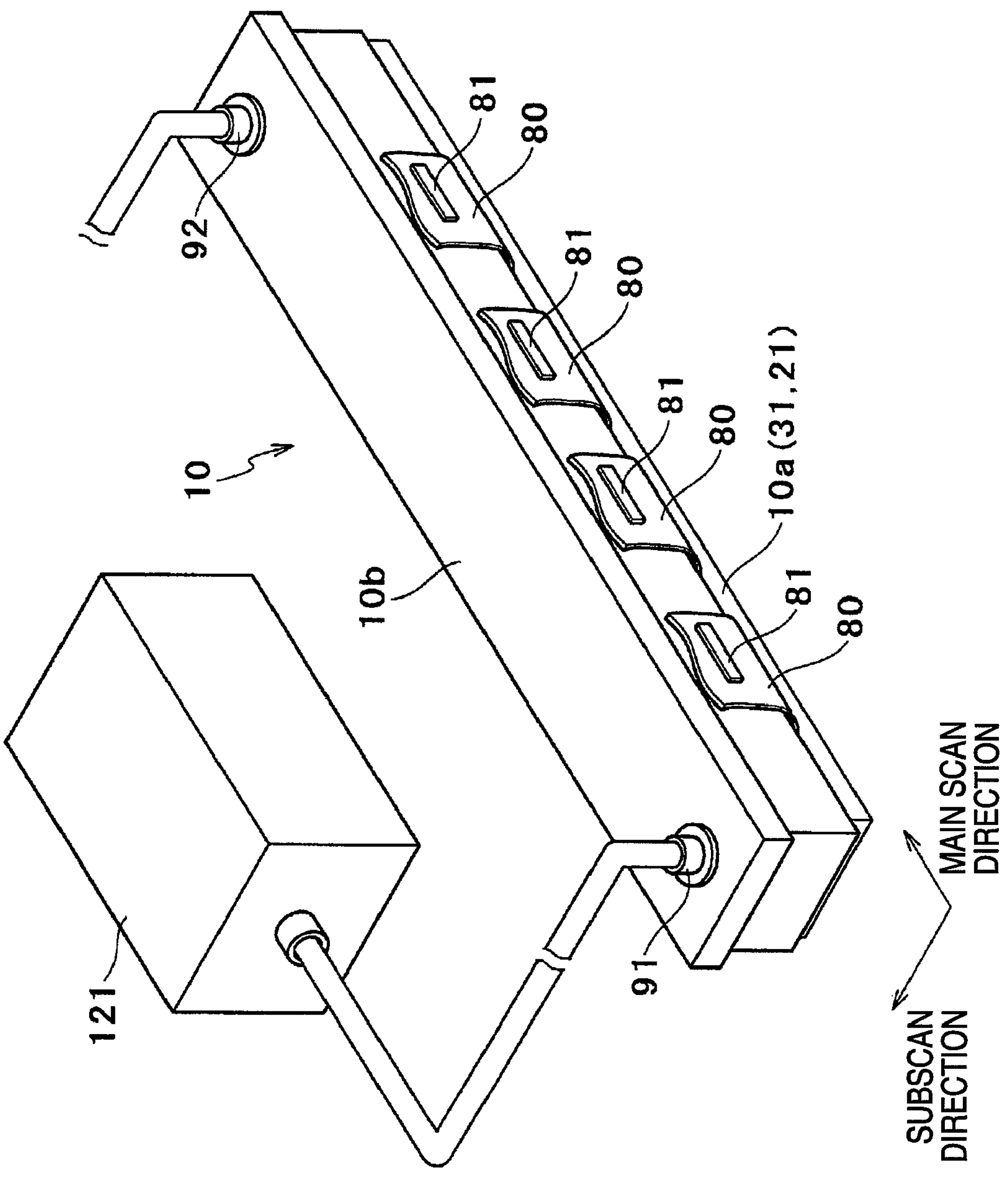
FIG. 2 is a perspective view of the inkjet head.

The ink tank unit 1*c* includes four main tanks 121 storing the respective color inks corresponding to the four heads 10. Each main tank 121 is connected via a tube to the corresponding head 10 as shown in FIG. 2.

The sheet supply unit 1*b* includes: a sheet supply tray 123 capable of housing a plurality of the sheets P; and a sheet supply roller 125 mounted to the sheet supply tray 123. Starting from an uppermost sheet, the sheets P in the sheet supply tray 123 are successively fed out by the sheet supply roller 125, guided by guides 127*a* and 127*b*, and fed to the conveying unit 122 while being sandwiched by a feed roller pair 126.

The conveying unit 122 includes: two belt rollers 6 and 7; an endless conveyor belt 8 wound spanningly across both rollers 6 and 7; a tension roller 9 adding tension to the conveyor belt 8 by being urged downward while contacting an inner peripheral surface of a lower loop of the conveyor belt 8; and a support frame 11 rotatably supporting the rollers 6, 7, and 9. When the belt roller 7, which is a drive roller, rotates clockwise in FIG. 1, the conveyor belt 8 travels, and the belt roller 6, which is a driven roller, rotates clockwise in FIG. 1 as well. A driving force from a conveyor motor M is transmitted via several gears to the belt roller 7.

An upper loop of the conveyor belt 8 is supported by a platen 19 so that a belt surface extends parallel to lower surfaces (ejection surfaces in which a plurality of ejection ports 18 that eject ink are opened (see FIGS. 4 and 5)) of the four heads 10 while being separated from the lower surface by a predetermined distance. The four heads 10 are disposed in parallel along the subscan direction and are supported by the casing 1*a* via a frame 3.

An anti-dropping plate 12 that is bent to a V-shape is disposed below the conveying unit 122, and foreign matter dropping from the sheet P, the conveyor belt 8, etc., are held by the anti-dropping plate 12.

A weakly adhesive silicon layer is formed on the surface of the conveyor belt 8. The sheet P fed to the conveyor unit 122 is pressed against the surface of the conveyor belt 8 by the presser roller 4 and is thereafter conveyed in the subscan direction along a solid, black arrow while being held on the conveyor belt 8 surface by the adhesive force of the surface. A sensor 15 detects that the sheet P is disposed so as to oppose the upper loop surface of the conveyor belt 8 at an immediately downstream side of the presser roller 4 in the subscan direction. The controller 100 ascertains the position of the sheet P based on a detection signal from the sensor 15 to control the driving of the heads 10.

During passage of the sheet P immediately below the four heads 10, the inks of the respective colors are ejected toward an upper surface of the sheet P from the ejection surfaces of the respective heads 10, thereby forming a desired color image on the sheet P. The sheet P is then separated from the surface of conveyor belt 8 by a separation plate 5, guided by guides 129*a* and 129*b*, conveyed upward while being sandwiched by two sets of feeding roller pairs 128, and ejected to the sheet ejection portion 131 from the opening 130 formed at the upper portion of the casing 1*a*.

A configuration of each head 10 shall now be described in detail with reference to FIGS. 1 to 6.

Figure 3:
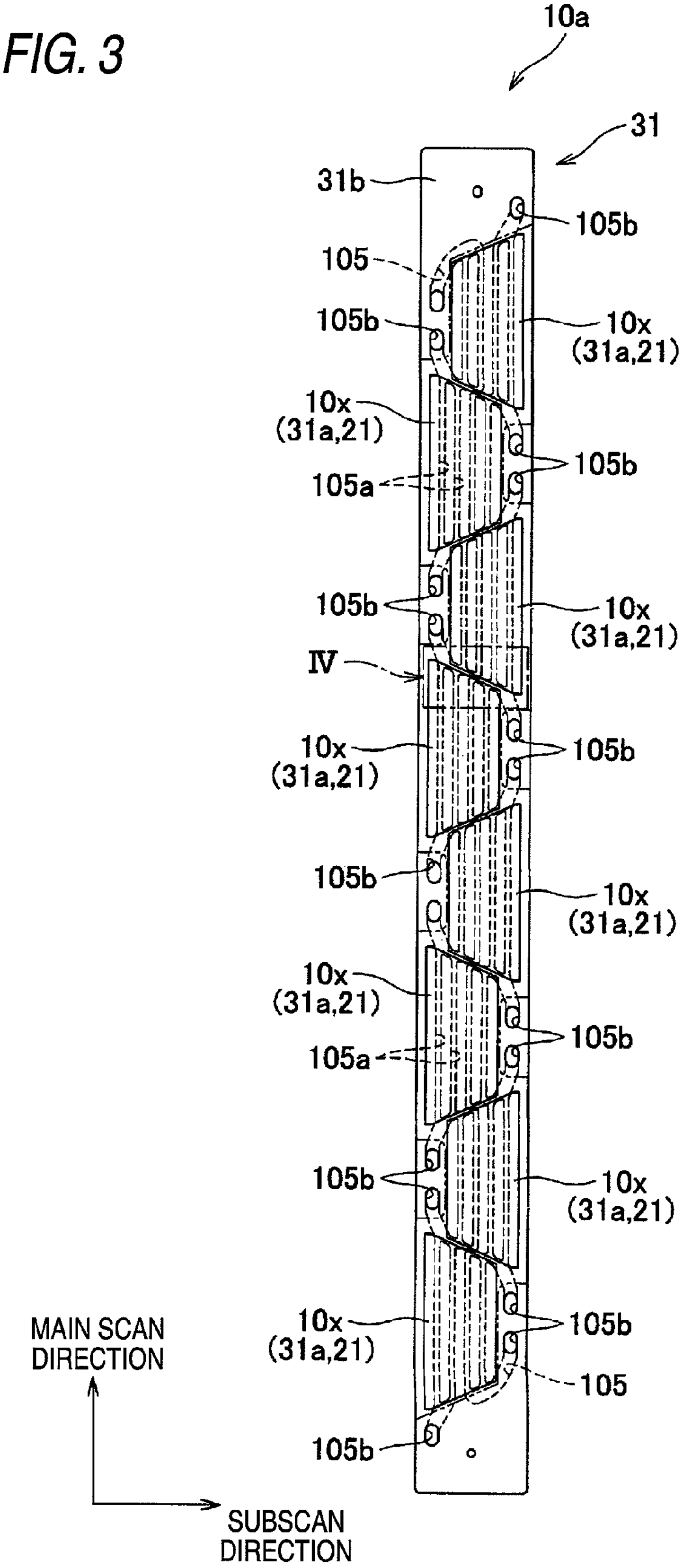
FIG. 3 is a plan view of a main head body of the inkjet head.

As shown in FIGS. 1 and 2, each head 10 includes a main head body 10*a* and a reservoir unit 10*b* in that order from a lower side. As shown in FIG. 3, the main head body 10*a* is a rectangular laminate that is elongated in the main scan direction in plan view. The main head body 10*a* has a passage unit 31 including: a substrate 31*b* having trapezoidal openings in a staggered manner along the main scan direction; eight, mutually-independent, trapezoidal passage modules 31*a*; and eight trapezoidal actuator modules 21 respectively disposed on upper surfaces of the passage modules 31*a*.

Figure 5:
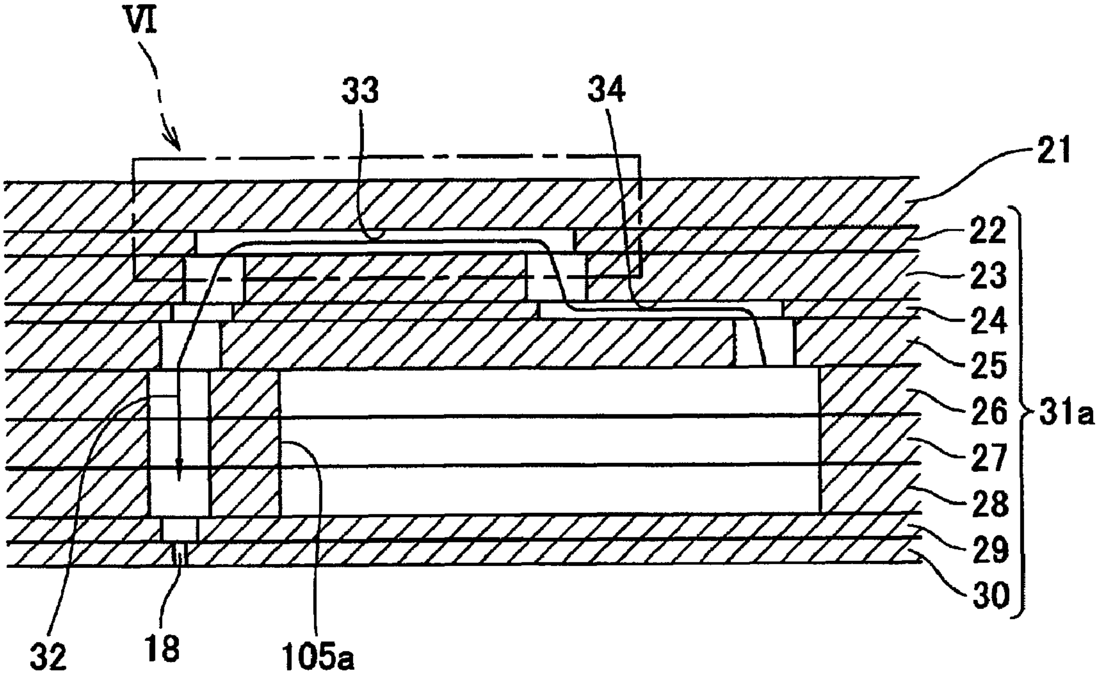
FIG. 5 is a sectional view taken on line V-V in FIG. 4.
Figure 6:
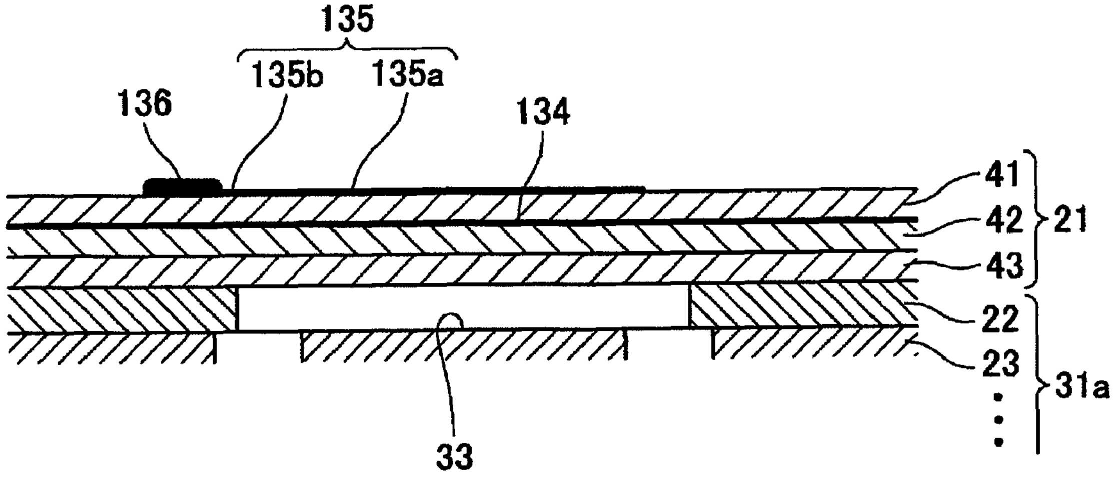
FIG. 6A is an enlarged view of a region surrounded by alternate long and short dash lines in FIG. 5.
FIG. 6B is a plan view of an individual electrode.
Figure 6:
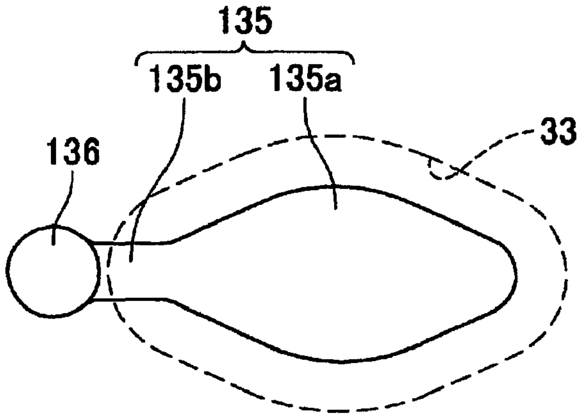

The passage modules 31*a* and the actuator modules 21 are substantially the same in shape and dimensions in a plan view and are laminated and adhered together as pairs in a one-to-one relationship to make up one head module 10*x* (see FIG. 5). That is, the main head body 10*a* is arranged by assembling the eight, mutually-independent, head modules 10*x* on the substrate 31*b*. Hypotenuses of adjacent head modules 10*x* overlap with each other in the subscan direction.

The respective head modules 10*x* are disposed in a staggered manner (that is, in regard to the subscan direction, alternately and equidistantly biased in mutually parallel and mutually opposing outward directions with respect to a center of the head 10 in the subscan direction) at predetermined intervals along the main scan direction. Each head module 10*x* is disposed so that a portion corresponding to a lower base of the trapezoidal shape is positioned near an end of the head 10 in the subscan direction. Recording at a predetermined definition is thereby enabled across an entirety of the sheet P in the main scan direction.

The passage modules 31*a* and the actuator modules 21 making up the head modules 10*x* are related to each other based on a magnitude of a resistance of individual ink passages 32 and a magnitude of a capacitance of actuators, which are described later. This will be described in detail in the description of the method of manufacture below.

The reservoir unit 10*b* is laminated on an upper surface of the substrate 31*b* of the passage unit 31 and, together with the passage unit 31, sandwiches the actuator modules 21. That is, the reservoir unit 10*b* is fixed on an upper surface portion of the substrate 31*b* at which the head modules 10*x* are not disposed (a region including openings 105*b* and defined by alternate long and two short dashes lines in FIG. 3) and is disposed to oppose the actuator modules 21 across a minute interval.

As shown in FIG. 2, a joint 91 to which is fixed a tube connected to the main tank 121 and a joint 92 to which is fixed a tube connected to a waste liquid tank are provided on an upper surface of the reservoir unit 10*b*. The reservoir unit 10*b* temporarily stores ink supplied via the joint 91 from the main tank 121 and supplies the ink to passages in the passage unit 31 via the openings 105*b* (see FIG. 3). Also, during purging or other maintenance procedures that are performed for keeping the ejection performance of the head 10 satisfactory, the ink inside the reservoir unit 10*b* is ejected to the waste liquid tank via the joint 92.

Both the substrate 31*b* and the passage modules 31*a* of the passage unit 31 are arranged by mutually laminating and adhering together a plurality of plates having through holes so as to form passages in the respective insides.

In the substrate 31*b*, eight through holes having openings of trapezoidal shape are formed in a staggered manner at predetermined intervals in the main scan direction. On the upper surface of the substrate 31*b*, the openings 105*b* (see FIG. 3B) are formed in a manner avoiding the eight trapezoidal openings. A total of eighteen openings 105*b* formed in one substrate 31*b* form two columns along the main scan direction, with two openings 105*b* being formed at positions opposing an upper base of each trapezoidal opening and one opening 105*b* being formed at an end side of each of the openings, among the eight trapezoidal openings, disposed at respective ends in the main scan direction (that is, near respective ends in the main scan direction of the substrate 31*b*). Manifold passages 105 connected to the openings 105*b* are formed in the inside of the substrate 31*b*. Each manifold passage 105 is opened at one end so as to connect to sub manifold passages 105*a* formed in the passage modules 31*a*. The substrate 31*b* may be a laminate of a plurality of metal plates or an integrally molded object formed, for example, of resin or other material besides metal.

Figure 4:
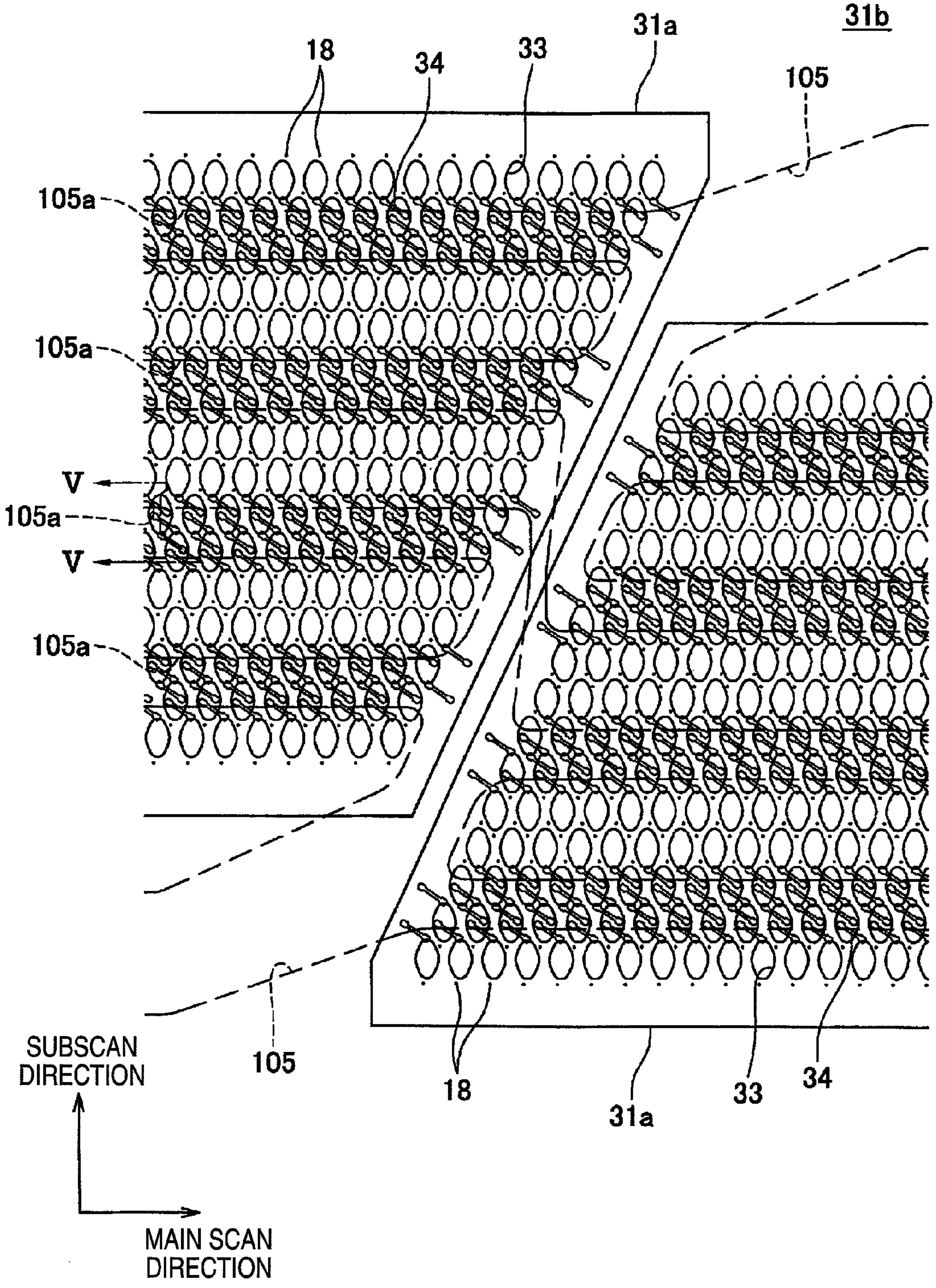
FIG. 4 is an enlarged view of a region surrounded by alternate long and short dash lines in FIG. 3.

As shown in FIG. 5, each passage module 31*a* includes nine metal plates 22, 23, 24, 25, 26, 27, 28, 29, and 30. As shown in FIG. 4, a plurality of (for example, 664) ejection ports 18 are formed in matrix form in a lower surface (ejection surface) of the passage module 31*a*. On the upper surface of the passage module 31*a*, that is, on the surface onto which the actuator module 21 is adhered, pressure chambers 33 corresponding to the respective ejection ports 18 are opened in the same matrix form as the ejection ports 18. In addition, in FIG. 4, the actuator modules 21 are omitted, and apertures 34 and the ejection ports 18, which are formed on the insides and the lower surfaces of the passage modules 31*a* and should conventionally be drawn with broken lines, are drawn with solid lines.

In each passage module 31*a*, four sub manifold passages 105*a* are formed extending in the main scan direction and the individual ink passages 32 branching from the sub manifold passages 105*a* (see FIG. 5). The individual ink passage 32 is formed for each ejection port 18 and refers to the passage leading from an exit of the sub manifold passage 105*a* (base end of an arrow indicating the individual ink passage 32 in FIG. 5) to the ejection port 18 via the aperture 34 serving as a throttle portion and the pressure chamber 33. The sub manifold passage 105*a* is opened at one end thereof so as to connect to the manifold passage 105 formed in the substrate 31*b*.

The pressure chambers 33 respectively have a substantially rhombic planar shape and, in one passage module 31*a*, form sixteen pressure chamber columns extending along the main scan direction (see FIG. 4). The pressure chamber columns extending in the main scan direction are aligned at predetermined intervals in the subscan direction and, in correspondence to the trapezoidal shape of the passage module 31*a*, the number of the pressure chambers 33 included in each column decreases as the upper base side is approached. A vicinity of an acute angle portion of the substantially rhombic shape of each pressure chamber 33 is sandwiched by the acute angle portions of two mutually adjacent pressure chambers 33 belonging to an adjacent column.

As with the pressure chambers 33, the ejection ports 18 form sixteen ejection port columns extending along the main scan direction. In plan view, two ejection port columns are each disposed with respect to one sub manifold passage 105*a*, that is, at respective sides in the width direction of one sub manifold passage 105*a*.

The aperture 34 is the portion of highest passage resistance in each individual ink passage 32 and has a function of adjusting a flow rate of ink supplied to the pressure chamber 33. Also, in the individual ink passage 32, the aperture 34 is the second smallest passage area next to the ejection port 18. For example, the ejection port 18 has an opening area of approximately 300 $\mu m^2$ (20 $\mu m\phi$), and the aperture 34 has a passage area of approximately 1200 $\mu m^2$ (60 $\mu m \times 20\ \mu m$) and a length of approximately 300 μm.

As with the passage module 31*a*, the substrate 31*b* is formed from the metal plates 22 to 30 in the present embodiment, as shown in FIG. 5. A total thickness of the substrate 31*b* is thus the same as a total thickness of the passage module 31*a*. The openings 105*b* and the manifold passages 105 that are in communication therewith are formed in the substrate 31*b*. In the substrate 31*b*, at peripheral walls that define the trapezoidal openings (through holes) into which the passage modules 31*a* are assembled, protrusions (not shown) that support the passage modules 31*a* are formed so as to protrude into the openings, and the manifold passages 105 are opened at the one end connecting with the sub manifold passages 105*a*. Each passage module 31*a* has a connecting portion corresponding to the protrusion (for example, a recessed portion that engages with the protrusion), and is assembled into the opening of the substrate 31*b* so as to be supported via the connecting portion by the protrusion formed on the peripheral wall of the substrate 31*b*. In this state, one end of the sub manifold passage 105*a* in the passage module 31*a* opposes the one end of the manifold passage 105 opened in the peripheral wall of the substrate 31*b*, and the passages 105 and 105*a* are thereby put into communication with each other. Also, a lower surface of the substrate 31*b* is at the same height as the ejection surface (lower surface) of the passage module 31*a*.

As shown in FIG. 6A, each actuator module 21 includes: three mutually laminated piezoelectric ceramic layers 41, 42, and 43; individual electrodes 135 formed on an upper surface of the uppermost piezoelectric ceramic layer 41 in correspondence to the respective pressure chambers 33; individual lands 136 electrically connected to the individual electrodes 135; and an internal common electrode 134 formed across an entire surface between the piezoelectric ceramic layer 41 and the piezoelectric ceramic layer 42 at the lower side. An electrode is not disposed between the piezoelectric ceramic layer 42 and the piezoelectric ceramic layer 43. The piezoelectric ceramic layers 41 to 43 are all formed of a lead zirconate titanate (PZT) based ceramic material having a ferroelectric property, and each has a thickness of approximately 15 μm and a trapezoidal shape that defines an outer shape of the actuator module 21.

As shown in FIG. 6B, each individual electrode 135 includes: a main electrode portion 135*a* with a substantially rhombic planar shape; an extended portion 135*b* extending from an acute angle portion at one side of the main electrode portion 135*a*; and the individual land 136 formed at a tip of the extended portion 135*b*. The main electrode portion 135*a* is substantially homothetic to the pressure chamber 33 and slightly smaller than the pressure chamber 33 in size. The main electrode portion 135*a* is disposed opposite the pressure chamber 33 in regard to the lamination direction of the piezoelectric ceramic layers 41, 42, and 43, and the extended portion 135*b* extends in a planar direction and outside the region opposing the pressure chamber 33. In regard to the lamination direction, the individual land 136 is disposed opposite the wall defining the pressure chamber 33 in the metal plate 22 and has a height of approximately 10 μm. A land for the common electrode is also disposed on a top surface of the piezoelectric ceramic layer 41 and is made continuous to the internal common electrode 134 via a through hole. The common electrode land has the same size and shape as the individual land 136.

Active portions of the piezoelectric ceramic layer 41 that are sandwiched by the respective individual electrodes 135 and the internal common electrode 134 function as the actuators that apply pressure to the ink inside the pressure chambers 33. That is, in each actuator module 21, the number of actuators equals the number of pressure chambers 33 formed in the passage module 31*a*, and the actuators are respectively formed so as to oppose the pressure chambers 33 in regard to the direction of lamination of the plate 22, etc.

One end of a flexible printed circuit board (FPC) 80, shown in FIG. 2, is connected to the individual lands 136 and the common electrode land of each actuator module 21. The FPC 80 is lead out upward from between the passage unit 31 and the reservoir unit 10*b* and is connected to a control circuit board (not shown) at the other end. A driver IC 81 is mounted at an intermediate portion of the FPC 80 between the actuator module 21 and the control circuit board. FPC 80 transmits the image signal output from the control circuit board to the driver IC 81, a drive voltage output from the driver IC 81 is supplied to the actuator module 21. The reservoir unit 10*b* and the passage module 31*a* are thermally coupled to the driver IC 81 via the FPC 80. As shown in FIG. 2, one driver IC 81 is provided in each single FPC 80.

The ink supplied from the reservoir unit 10*b* into the passage unit 31 via the openings 105*b* passes through the manifold passages 105 inside the substrate 31*b* and flows into the respective individual ink passages 32 via the sub manifold passages 105*a* in the respective passage modules 31*a*. When the actuator modules 21 are then driven in accordance with the drive voltages from the driver ICs 81 under the control of the controller 100 (see FIG. 1), pressure is applied to the ink in the pressure chambers 33 in accordance with volume changes in the pressure chambers 33 and the ink is ejected from the corresponding ejection ports 18.

A method of manufacturing the head 10 shall now be described with reference to FIG. 7.

Figure 7:
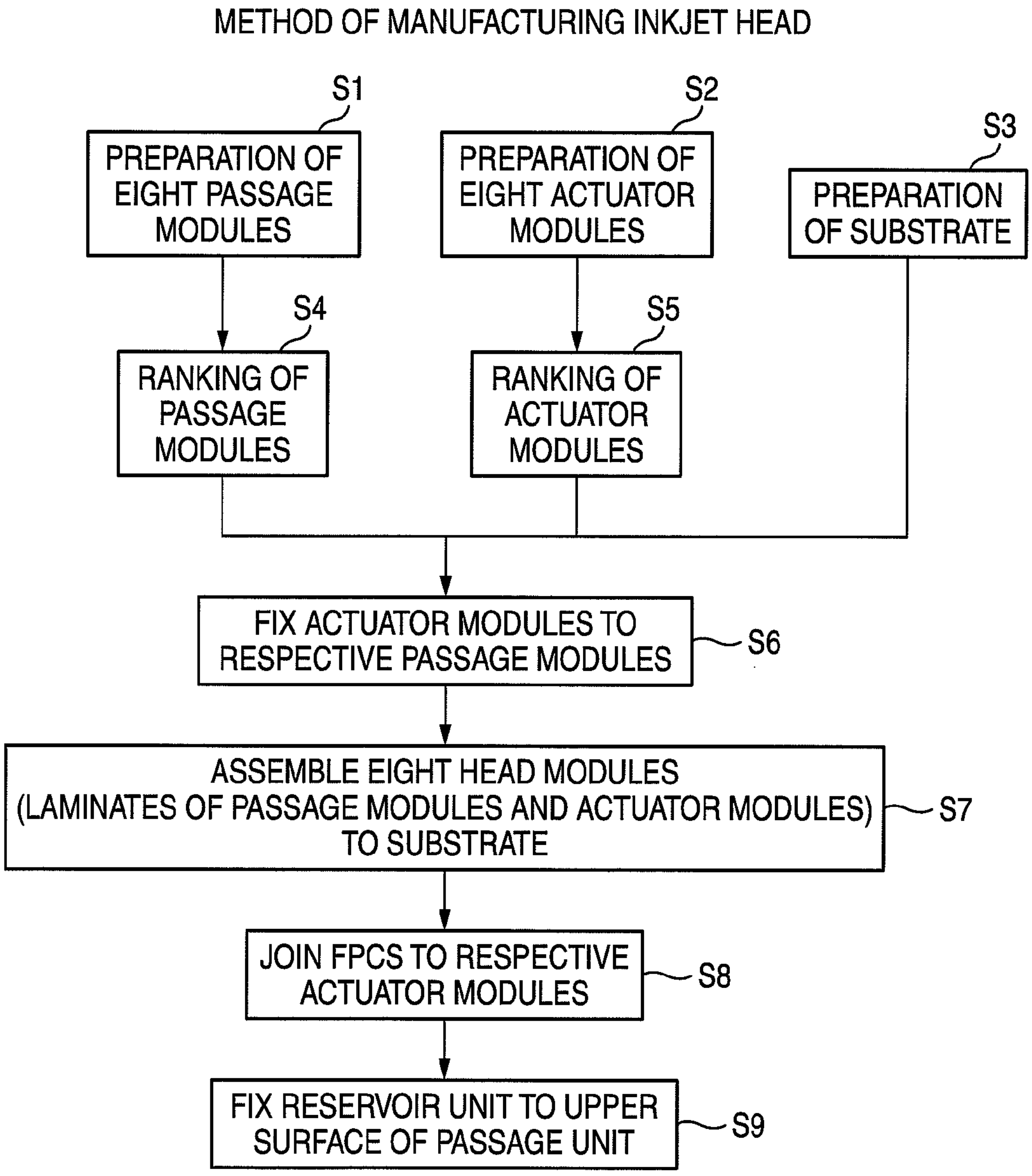
FIG. 7 is a process diagram of a method of manufacturing an inkjet head.
Figure 8:
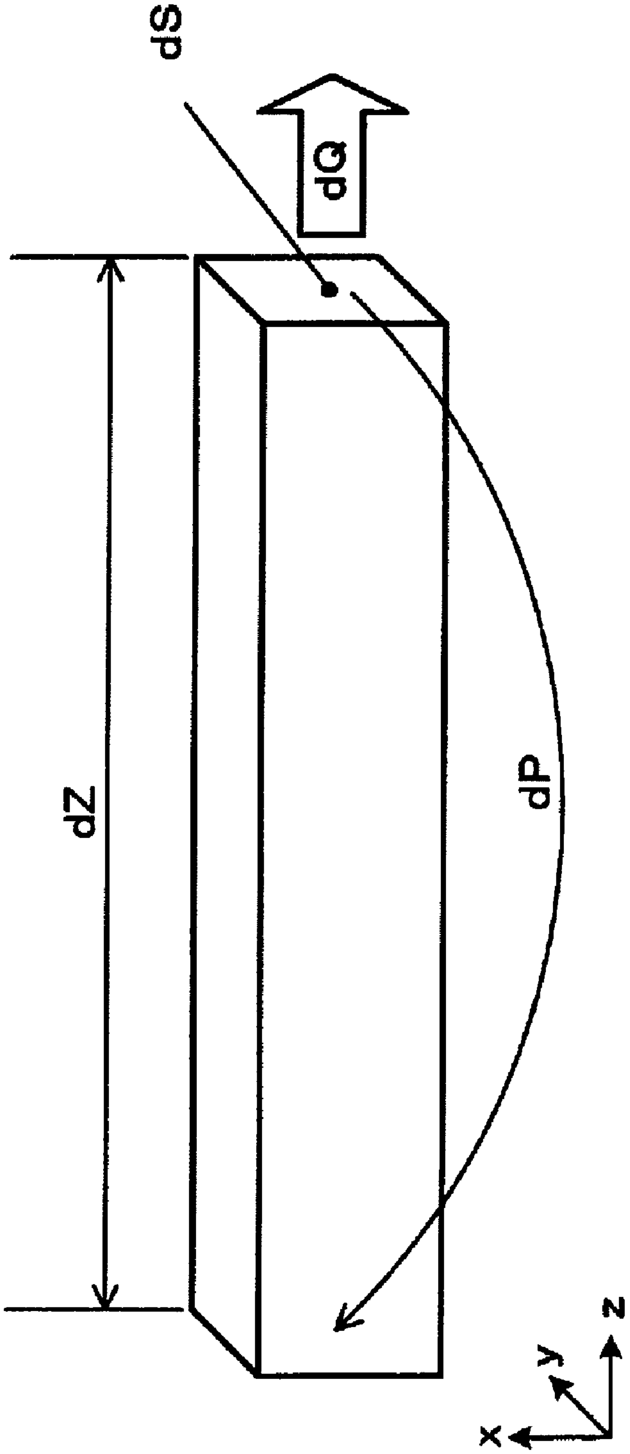
FIG. 8 is a schematic view for explaining a passage resistance computing formula used in ranking passage modules.

First, eight of each of the passage modules 31*a* and the actuator modules 21 that make up the head modules 10*x* are prepared separately from one another (S1 and S2 of FIG. 7). Further, the substrate 31*b* that houses the head modules 10*x* is also prepared (S3 of FIG. 7). The preparation of the passage modules (S1), the preparation of the actuator modules (S2), and the preparation of the substrate 31*b* (S3) are each performed independently and any of these may be performed before the others or may all be performed in parallel.

In the passage module preparation step (S1), first, etching using a patterned photoresist as a mask is applied respectively to nine metal plates, made of stainless steel, etc., to form holes and thereby prepare the plates 22 to 30, which make up the passage modules 31*a* (see FIG. 5). Thereafter, the plates 22 to 30 are laminated via an adhesive so as to form the individual ink passages 32 and are then pressurized while heating. The adhesive is thereby hardened so that the plates 22 to 30 are fixed to each other and the passage module 31*a* is completed. As the adhesive for this step, a thermosetting, epoxy-based adhesive is used.

Before joining the plates 22 to 30 in S1, several parameters are measured. These parameters are used in computing magnitudes of passage resistances in a ranking step (S4) to be performed later. In the present embodiment, only a portion of individual ink passages 32 (for example, 90 randomly extracted passages) among the plurality of (for example, 664) individual ink passages 32 included in each passage module 31*a* are used in the measurement of the parameters. Also, dimensions of the ejection ports 18 and the apertures 34, which are the portions in the individual ink passages 32 that have large influences on the passage resistance, are measured. Here, the dimensions of the ejection ports 18 and the apertures 34 refer to a diameter of a hole making up the ejection port 18, a width and length of a groove making up the aperture 34, and thicknesses of the plates 30 and 24 in which the holes and grooves are formed, for example.

In the actuator module preparation step (S2), first, three green sheets, which are to become the piezoelectric ceramic layers 41 to 43 (see FIG. 6A), are prepared for each actuator module 21. An Ag—Pd-based conductive paste is then screen printed respectively in a pattern of the individual electrodes 135 on the green sheet that is to become the piezoelectric ceramic layers 41 and in a pattern of the internal common electrode 134 on the green sheet that is to become the piezoelectric ceramic layer 42. Thereafter, while positioning using a jig, the green sheet that is to become the piezoelectric ceramic layer 42 is overlapped, with the surface having the internal common electrode 134 printed thereon facing up, onto the piezoelectric ceramic layer 43, on which printing has not been performed, and the piezoelectric ceramic layer 41 is further overlapped above with the surface having the individual electrodes 135 printed thereon faced up. The laminate of the green sheets is then degreased in the same manner as known ceramics and baked at a predetermined temperature. Thereafter, an Au-based conductive paste, which contains a glass frit and is to become the individual lands 136, is printed onto the extended portions 135*b* of the respective individual electrodes 135. The common electrode land is also printed in likewise manner at this time. Each actuator module 21 is thereby completed.

In the substrate preparation step (S3), nine metal plates are prepared as in the passage module preparation step (S1). An etching process using a patterned photoresist as a mask is then applied to the respective plates. Thereafter, the respective plates are laminated via an adhesive so that the holes formed by the etching are put in communication with each other and then plates are heated and pressurized. The respective plates are thereby fixed to each other and the substrate 31*b*, having the ink passages continuing from the openings 105*b* to the manifolds 105 formed in the inside, is thereby completed. The respective plates used in the substrate preparation step (S3) have the same material quality and thickness as the plates used in the passage module preparation step (S1) and the same thermosetting adhesive is also used as the adhesive.

After eight of each of the passage modules 31*a* and the actuator modules 21 that make up on the head 10 have thus been separately prepared, the modules are ranked (S4 and S5). As with steps S1, S2, and S3, the ranking of the passage modules (S4) and the ranking of the actuator modules (S5) are performed independently of each other and either may be performed before the other or both may be performed in parallel.

The ranking of the passage modules (S4) is performed based on the magnitude of the passage resistance of the individual ink passages 32 (see FIG. 5) included in the passage modules 31*a*. In the present embodiment, the following Formulae (1), (2), and (3), based on the schematic diagram of FIG. 9, are used to compute the passage resistance with the dimensions of the ejection ports 18 and the apertures 34 of the portion of the individual ink passages 32 of each passage module 31*a* that were measured before joining the plates 22 to 30 in S1 as parameters. In Formulae (1) to (3), μ is a viscosity coefficient of the ink, R is the passage resistance, dS is a passage cross-sectional area, dZ is a passage length, dP is a pressure difference between respective ends of the passage, dQ is a volumetric flow rate of the ink in a hypothetical passage tube of FIG. 9, and w is a flow speed in a z direction of the ink in the hypothetical tube. The viscosity coefficient (μ) of the ink is determined by the type of ink used in the head 10. The passage cross-sectional area (dS) is determined by the hole diameter in the ejection port 18, and by the width of the groove and the thickness of the plate 24 in the aperture 34. The passage length (dZ) is determined by the thickness of the plate 30 in the ejection port 18, and by the length of the groove in the aperture 34. Finite element analysis, etc., may be performed to obtain values with high precision.

Formula 1

$$\frac{\partial^2 w}{\partial x^2} + \frac{\partial^2 w}{\partial y^2} = -\frac{1}{\mu} \cdot \frac{dP}{dZ} \tag{1}$$

$$dQ = \int w\,dS \tag{2}$$

$$R = \frac{dP}{dQ} \tag{3}$$

The passage resistances of the ejection port 18 and the aperture 34 computed as described above are synthesized as the passage resistance of the corresponding individual ink passage 32, and the passage resistance of each of the 90 individual ink passages 32 are thereby determined. Further, an average value of the passage resistances of the 90 individual ink passages 32 is determined as the passage resistance of the individual ink passages 32 in the corresponding passage module 31*a*.

Then, based on the magnitude of the passage resistance of the individual ink passages 32, the eight passage modules 31*a* (see FIG. 3) are respectively ranked successively, starting from those of lowest passage resistance, into the four ranks of first, second, third, and fourth ranks (S4). Specifically, lower limit values L2, L3, and L4 ($L2<L3<L4$) are set for the second, third, and fourth ranks, and the passage modules 31*a* having the passage resistance of the individual ink passages 32 less than L2 are ranked in the first rank, those passage modules having the passage resistance not less than L2, but less than L3 are ranked in the second rank, those passage modules having the passage resistance not less than L3, but less than L4 are ranked in the third rank, and those passage modules having passage resistance not less than L4 are ranked in the fourth rank.

The ranking of the actuator modules (S5) is performed based on the magnitude of the capacitance of the actuators (active portions of the piezoelectric ceramic layer 41 sandwiched by the respective individual electrodes 135 and the internal common electrode 134) included in each actuator module 21. In the present embodiment, as in the above-described ranking of the passage modules 31*a*, in computing the capacitance, only a portion of the actuators (for example, 90 randomly extracted actuators) among the plurality of (for example, 664) actuators included in each actuator module 21 are used. The 90 actuators used here respectively correspond to the 90 individual ink passages 32 extracted in the ranking of the passage modules 31*a* (S4) (that is, the actuators that oppose the pressure chambers 33 in the corresponding individual ink passages 32 and apply pressure to the ink in the pressure chambers 33). Also, as shown in FIG. 7, in step S5, the actuator modules 21 are in a state of not being fixed to the passage modules 31*a*.

Figure 10:
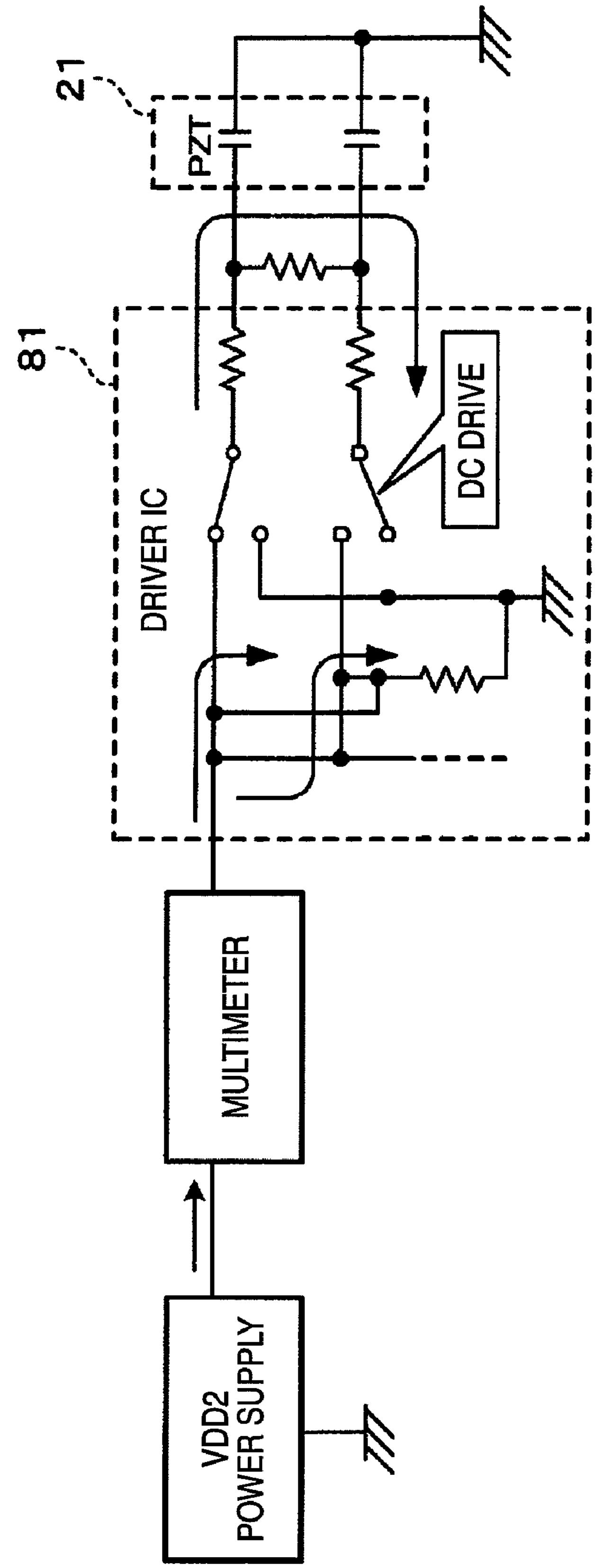
FIG. 10 is a schematic view of a measurement circuit for measuring a capacitance of an actuator in an actuator module.

First, a measurement circuit such as shown in FIG. 10 is set up for each actuator module 21 and measurements are made. A pulse voltage is applied to the actuator being measured and the capacitance is determined from a charge-discharge current that is generated in this process. Specifically, charging and discharging of the actuator are repeated by successively driving one-by-one each of the 90 actuators included in the actuator module 21 with a pulse voltage of 20 kHz frequency. A supply current $I_1$ from a VDD2 power supply in this process is measured. Actuators besides the measured actuator are held at a ground potential during this process. Further, the 90 actuators are successively driven one-by-one by a DC voltage, and a supply current $I_2$ from the VDD2 power supply in this process is measured. The values $I_1$ and $I_2$, a voltage V of the VDD2 power supply, and the drive frequency F are then used to compute the capacitance C according to the following Formula (4).

Formula 2

$$C = \frac{I_1 - I_2}{V \cdot F} \qquad (4)$$

$$\left[\begin{array}{ll} C = \frac{Q}{V} = \frac{I}{V \cdot F} & (5) \\ I_1 = I_{L1D} + I_{L1CH} + I & (6) \\ I_2 = I_{L2D} + I_{L2CH} & (7) \\ I_{L1D} \approx I_{L2D} & (8) \\ L_{L1CH} \approx I_{L2CH} & (9) \end{array}\right]$$

Formula (4) is obtained from Formulae (5), (6), (7), (8), and (9). In Formulae (5) to (9), Q is a charge, I is the charge-discharge current, $I_{L1D}$ is an internal leak current of the driver IC 81 during the pulse voltage drive, $L_{L1CH}$ is a leak current between adjacent actuators during the pulse voltage drive, $I_{L2D}$ is an internal leak current of the driver IC 81 during the DC voltage drive, and $I_{L2CH}$ is a leak current between adjacent actuators during the DC voltage drive.

Further, for each single actuator module 21, an average value of the capacitances of the 90 actuators is determined as the capacitance of the actuators in the actuator module 21. Then, based on the magnitude of the capacitance of the actuators, the eight actuator modules 21 (see FIG. 3) are respectively ranked successively starting from those of lower capacitance into the four ranks of first, second, third and fourth ranks as shown in FIG. 9 (S5). Specifically, as in the ranking of the passage modules 31*a* described above, lower limit values A2, A3, and A4 (A2<A3<A4) are set for the second, third, and fourth ranks, and the actuator modules 21 in which the capacitance of the actuators is less than A2 are ranked in the first rank, those actuator modules in which the capacitance is not less than A2, but is less than A3 are ranked in the second rank, those actuator modules in which the capacitance is not less than A3, but is less than A4 are ranked in the third rank, and those actuator modules in which the capacitance is not less than A4 are ranked in the fourth rank.

Thereafter, the respectively ranked passage modules 31*a* and actuator modules 21 are made to correspond to each other according to combinations marked with circles in FIG. 9, and one passage module 31*a* is fixed to one actuator module 21 (S6). A thermosetting adhesive is used for fixing in this step. Here, passage modules 31*a* with a comparatively high passage resistance of the individual ink passage 32 are made to correspond to actuator modules 21 with a comparatively high capacitance of the actuators, and the passage modules 31*a* with a comparatively low passage resistance of the individual ink passage 32 are made to correspond to actuator modules 21 with a comparatively low capacitance of the actuators.

Specifically, as shown in FIG. 9, the passage modules 31*a* with the comparatively high passage resistance of the individual ink passages 32 and ranked in the third or the fourth rank (that is, having a passage resistance not less than the lower limit value L3 of the third rank) are made to correspond to the actuator modules 21 with the comparatively high capacitance of the actuators and ranked in the third or the fourth rank (that is, having a capacitance not less than the lower limit value A3 of the third rank). Also, the passage modules 31*a* with the comparatively low passage resistance of the individual ink passages 32 and ranked in the first or the second rank (that is, having a passage resistance less than the lower limit value L3) are made to correspond to the actuator modules 21 with the comparatively low capacitance of the actuators and ranked in the first or the second rank (that is, having a capacitance less than the lower limit value A3). The passage modules 31*a* ranked in the second and third ranks are also made to correspond respectively to the actuator modules 21 ranked in the third and second ranks.

The eight head modules 10*x* (the laminates of the passage module 31*a* and the actuator module 21) prepared in S6 are then assembled by a suitable adhesive, etc., into the trapezoidal openings formed in the substrate 31*b* of the passage unit 31 (S7). The main head body 10 is thereby completed.

Thereafter, one end of the FPC 80 (see FIG. 2) is bonded to each actuator module 21 by coating the conductive adhesive onto the individual lands 136 and the common electrode land, etc. (S8). Further thereafter, the reservoir unit 10*b* (see FIG. 2) is fixed to the upper surface of the passage unit 31 (S9). The head 10 is thereby completed. The driver ICs 81 are mounted to the FPCs 80 in advance in a separate step.

The method of manufacturing one head 10 was described above, and the printer 1 in FIG. 1 is manufactured by carrying out a step of placing four heads 10, respectively manufactured by the above-described method, inside the casing 1*a* and fixing the heads to the frame 3, etc.

The method of manufacturing the head 10, the method of manufacturing the printer 1, the head 10, and the printer 1 according to the present embodiment described above recognize the passage resistance of the individual ink passages 32 has an influence on the fluidity of the ink, and the capacitance of the actuators has an influence on an amount of heat generation occurring at the driver IC 81. When the passage resistance is high, the fluidity of the ink is low. When the capacitance of the actuators is high, the amount of heat generated from the driver IC 81 is high. Thus, by combining the passage module 31*a* having passages in which the fluidity of the ink is low with the actuator module 21 of high capacitance (with which the amount of heat generated from the driver IC 81 is high) as described above, the making of the fluidity of the ink uniform is promoted especially in low temperature states. Further, by making the passage modules 31*a* and the actuator modules 21 correspond based on the magnitudes of the passage resistance and the capacitance, the fluidity of the ink can be made uniform and recording of good quality can be realized either among the eight passage modules 31*a* included in one head 10 or among the four heads 10 included in one printer 1, or both, even in a case of using an ink of comparatively high viscosity.

Also, the method of manufacturing according to the present embodiment includes the passage unit preparation step (corresponding to step S6 of FIG. 7), in which the eight passage modules 31*a*, made up of mutually independent members, are assembled onto the one substrate 31*b* to prepare the passage unit 31 that includes the eight passage modules 31*a*. In other words, the head 10 includes the passage unit 31 that includes the eight passage modules 31*a*, made up of mutually independent members, and the one substrate 31*b*, onto which the eight passage modules 31*a* are assembled. The passage module ranking step (S4) is thereby facilitated. Further, the fluidity of the ink can readily be made the same among the passage modules 31*a*, and the passage unit 31 without variation in the fluidity of the ink (that is, with which the ink fluidity is made uniform) can be prepared readily.

In the passage module ranking step (S4), the dimensions of the ejection port 18 and the aperture 34 are used as factors of the passage resistance related to the ranking. In this case, the ranking can be performed more appropriately because the ejection port 18 and the aperture 34 are the portions that have large influence on the passage resistance.

As shown in FIGS. 2 and 3, one IC driver 81 is provided for each of the eight actuator modules 21. In this case, the actuator modules 21 and the drive ICs 81 are put in a one-to-one relationship, and thus the effect of making uniform the fluidity of the ink by performing the actuator module ranking step (S5) is realized even more reliably.

With each head 10, the passage modules 31*a* and the actuator modules 21 are respectively aligned along the longitudinal direction of the head 10 and the eight driver ICs 81 are aligned along the longitudinal direction of the head 10 so as to respectively correspond to the passage modules 31*a*. In this case, variation of temperature along the longitudinal direction of the head 10 can be suppressed to realize uniformity of the fluidity of the ink even in a case where the head 10 is long in one direction, as in a line type head.

In the passage module ranking step (S4), the ranking of the passage modules 31*a* is performed based on the passage resistance of a portion of the plurality of individual ink passages 32 in each passage module 31*a* (for example, 90 individual ink passages among the total of 664). In this case, the step can be performed more efficiently in comparison to a case of performing the ranking based on the passage resistance of all of the individual ink passages 32 in each passage module 31*a*.

Likewise, in the actuator module ranking step (S5), the ranking of the actuator modules 21 is performed based on the capacitance of a portion of the plurality of actuators in each of the actuator modules 21 (for example, 90 actuators among the total of 664). In this case, the step can be performed more efficiently in comparison to the case of performing the ranking based on the capacitance of all of the actuators in each actuator module 21.

Further, the portion of the actuators used in the actuator module ranking step (S5) correspond to the portion of the individual ink passages 32 (that is, the 90 randomly extracted individual ink passages 32) in each passage module 31*a* used in the passage module ranking step (S4). In a case of using the individual ink passages 32 and the actuators that do not correspond to each other in each of S4 and S5, there arises a problem that ranking cannot be performed appropriately due to influence of variations in the magnitudes of the passage resistance and the capacitance within each of the modules 31*a* and 21. Meanwhile, with the above configuration, this problem is alleviated and the ranking precision is improved.

In each of the passage module ranking step (S4) and the actuator module ranking step (S5), ranking into not less than three ranks is performed (see FIG. 9). In this case, more appropriate combinations of the passage modules 31*a* and the actuator modules 21 can be realized, and the effect of making uniform the fluidity of the ink can be obtained even more reliably.

Further, in each of the passage module ranking step (S4) and the actuator module ranking step (S5), ranking into the four ranks of first, second, third, and fourth ranks is performed successively starting from modules of lowest passage resistance and lowest capacitance as shown in FIG. 9. Then, in the actuator module fixing step (S6), the actuator modules 21 are fixed to the passage modules 31*a* so that the actuator modules 21 ranked in the first or the second rank correspond to the passage modules 31*a* ranked in the first or the second rank, the actuator modules 21 ranked in the second or the third rank correspond to the passage modules 31*a* ranked in the second or the third rank, and the actuator modules 21 ranked in the third or the fourth rank correspond to the passage modules 31*a* ranked in the third or the fourth rank. In this case, appropriate combinations of the passage modules 31*a* and the actuator modules 21 are realized while suppressing complication of the ranking steps (S4 and S5).

Figure 11:
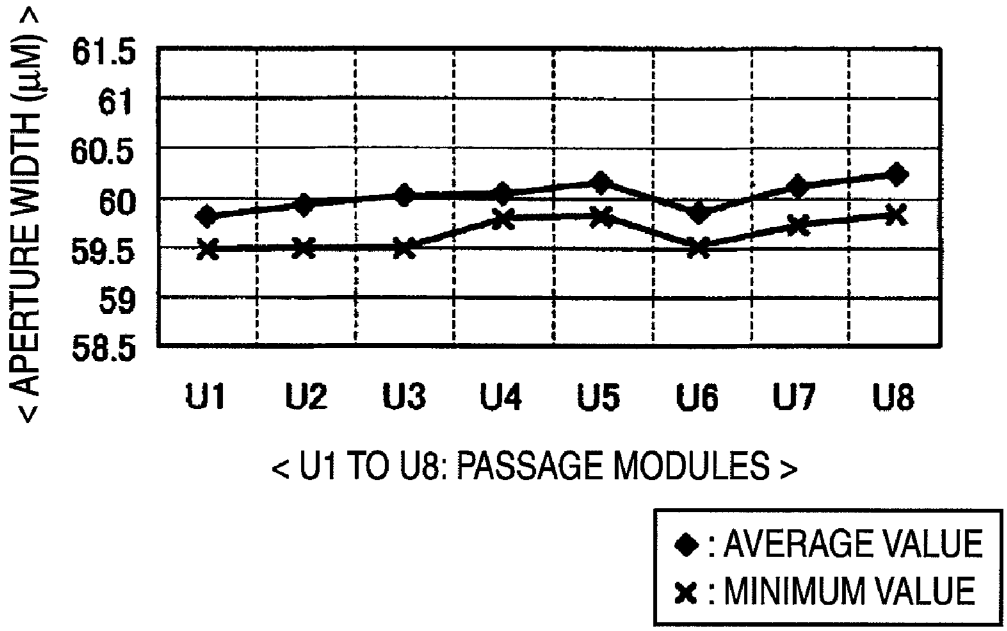
FIG. 11A is a graph of measurement values of widths of apertures in each of eight passage modules.
FIG. 11B is a graph of computed values of the passage resistances of the aperture portions in each of the eight passage modules.
Figure 11:
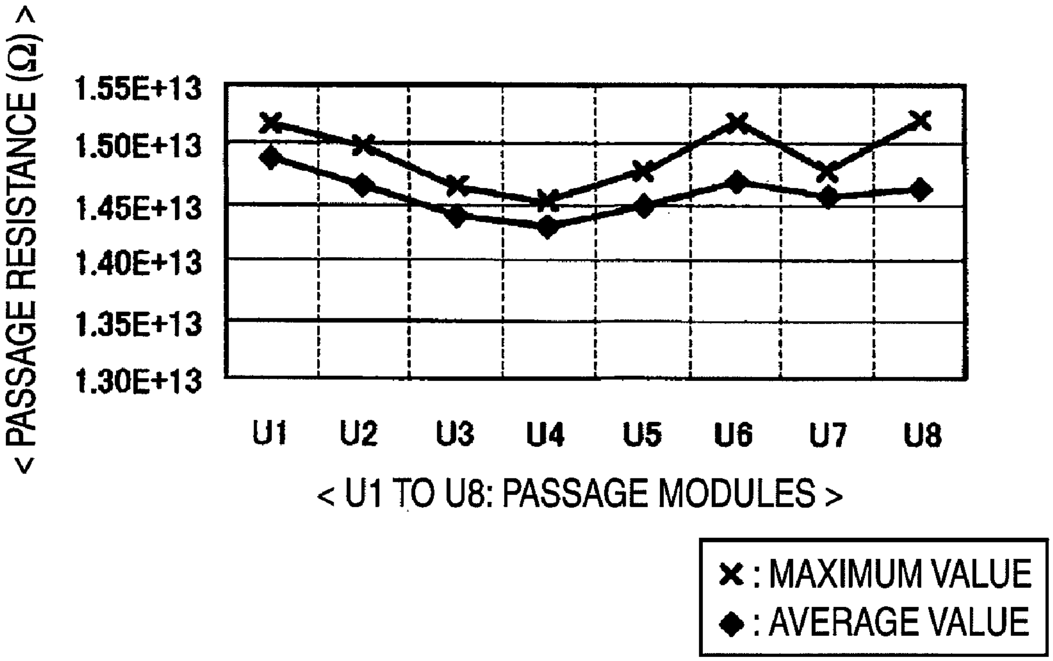

In this embodiment of the present invention, the passage modules and the actuator modules are ranked and made to correspond as described above under the premise that there are differences in the passage resistance of the individual passages among the plurality of passage modules and in the capacitance of the actuators among the plurality of actuator modules. In this regard, actually measured values (average values (respectively obtained by determining the average for the apertures 34 of 90 individual ink passages among the 664 individual ink passages included in the one passage module 31*a*) and minimum values) of the width (design value: 60 μm) of the groove making up the aperture 34 are shown in FIG. 11A for the respective passage modules 31*a* in the case where eight passage modules 31*a* are included in one head 10 as in the above-described embodiment. From this figure, it can be understood that there is variation in the width of the aperture 34 among the eight passage modules 31*a* and as well as variation in the width among the apertures 34 in the one passage module 31*a*. Such variations arise due to dimensions of the base material, etching and other manufacturing processes, etc. Also, variations arise in the passage resistance due to such variations in the dimensions. FIG. 11B is a graph of results of using the Formulae (1) to (3) to compute the passage resistances (average values and maximum values) of the aperture 34 portions of the respective passage modules 31*a* on the basis of the graph of FIG. 11A. From this figure, it can be understood that there is variation in the passage resistance of the aperture 34 portion among the eight passage modules 31*a* as well as variation in the passage resistance among the apertures 34 in the one passage module 31*a*.

Drive control of the head 10 shall now be described. Generally, in a situation where an environmental temperature is comparatively high, the viscosity of the ink is low, and thus large differences in the fluidity of the ink do not occur among the passage modules 31*a* and among the heads 10. On the other hand, in a situation where the environmental temperature is comparatively low, the viscosity of the ink is high and large differences in the fluidity of the ink tend to occur readily among the passage modules 31*a* and the among the heads 10. However, with the present embodiment, even in such a case, the passage modules 31*a* of high passage resistance (having passages of low fluidity of the ink) are combined with the actuator modules 21 of high capacitance (with which the amount of heat generated from the driver IC 81 is high) so that differences in the fluidity of the ink are less likely to occur among the passage modules 31*a* despite the environmental temperature. Also, by the combinations of the passage modules 31*a* and the actuator modules 21, differences in the fluidity of the ink are less likely to occur even among the heads 10*a*. Here, the drive control of the head 10 is preferably performed as follows to further promote uniformity of the fluidity of the ink.

That is, in regard to one head 10, at least one of: the drive voltage supplied from the driver IC 81 to the actuator module 21; an application time of a single pulse supplied to the driver IC 81; and a total application time of pulses is adjusted to make uniform the fluidity of the ink among the plurality of passage modules 31*a* included in one head 10 during the driving of the actuators. Also, the driving of the respective heads 10 is adjusted as described above so that the fluidity of the ink is made uniform among the four heads 10 included in the printer 1. In either of the former and latter cases, the passage modules 31*a* and the actuator modules 21 are ranked as described in the above embodiment and then the driving is adjusted so that differences in the fluidity of the ink are resolved based on the ranking.

In regard to the control of the printer 1, the driving may be adjusted as described above by taking into consideration only making the fluidity of the ink uniform among the four heads 10 included in the printer 1 and without taking into consideration making the fluidity of the ink among the plurality of passage modules 31*a* included in one head 10 uniform (that is, without providing a difference in the drive voltage, etc., supplied to the respective actuator modules 21 in the one head 10) or the drive may be adjusted by taking both (the making of the fluidity of the ink uniform within the one head 10 and the making of the fluidity of the ink uniform among the four heads 10) into consideration.

To increase the heat generation amount arising in the driver IC 81, it is effective to perform so-called non-ejection flushing (adjusting the magnitude of the drive voltage from the driver IC 81, the application time of a single pulse supplied to the driver IC 81, the pulse width, etc., to drive the driver IC 81 without making ink be ejected from the ejection port 18).

By such a control method, the fluidity of ink can be made uniform either among the plurality of passage modules 31*a* included in one head 10 and among the plurality of heads 10 included in one printer 1.

Although a preferred embodiment of the present invention has been described above, the present invention is not restricted to the above-described embodiment, and various design changes are possible within the scope described by the claims.

For example, although the actuator module includes piezoelectric type actuators in the above-described embodiment, the actuator module is not limited thereto and may instead include electrostatic or other type of actuators.

Although prepared by laminating a plurality of plates having holes formed by etching in the above-described embodiment, the passage module is not restricted thereto and may have holes formed by a method other than etching and is also not restricted to a plate lamination structure.

In the above-described embodiment, in the one printer 1, the fluidity of the ink is made uniform among the plurality of passage modules 31*a* included in each head 10 by performing the ranking of the passage modules 31*a* and the actuator modules 21 (S4 and S5) in each of the four heads 10 included in the printer 1. However, the present invention is not restricted thereto, and in place of performing the ranking of the passage modules 31*a* and the actuator modules 21 (S4 and S5) in each of the four heads 10, for example, an average passage resistance and an average capacitance may be determined for each head 10 and the ranking may be performed among the four heads 10. Uniformity of the fluidity of the ink among the heads 10 in the one printer 1 is thereby realized.

Each of the steps of ranking the passage modules 31*a* and the actuator modules 21 (S4 and S5) is not restricted to performing ranking into the four ranks as shown in FIG. 9 and it suffices that ranking into not less than two ranks be performed in each step. Also, in regard to the making of the passage modules 31*a* and the actuator modules 21 correspond, the present invention is not restricted to the correspondence shown in FIG. 9 and it suffices that the passage modules 31*a* with a comparatively high passage resistance of the individual ink passage 32 are made to correspond to actuator modules 21 with a comparatively high capacitance of the actuators, and the passage modules 31*a* with a comparatively low passage resistance of the individual ink passage 32 are made to correspond to actuator modules 21 with a comparatively low capacitance of the actuators.

The portions of the individual ink passages 32 and the actuators used in the ranking steps (S4 and S5) do not have to correspond to each other.

In regard to the ranking steps (S4 and S5), although only 90 each of the ink passages 32 and the actuators, which represent only portions of the total of 664 respectively, are used in the embodiment described above, these numerical values are only an example and can be changed as suited. Also, the ranking steps may be performed not just based on portions as in the above case but may be performed based on all of the individual ink passages 32 in the passage module 31*a* or based on all of the actuators in the actuator module 21.

Although the dimensions of the ejection port 18 and the aperture 34 are used as factors of the passage resistance in the passage module ranking step (S4) in the above-described embodiment, the present invention is not restricted thereto, and the dimension of either the ejection port 18 or the aperture 34 may be used or a suitable portion in the individual ink passage 32 may be used as a factor of the passage resistance. Also, the passage resistance may be computed not based on a specific portion in the individual ink passage 32 but on an overall configuration of the individual ink passage 32.

Figure 14:
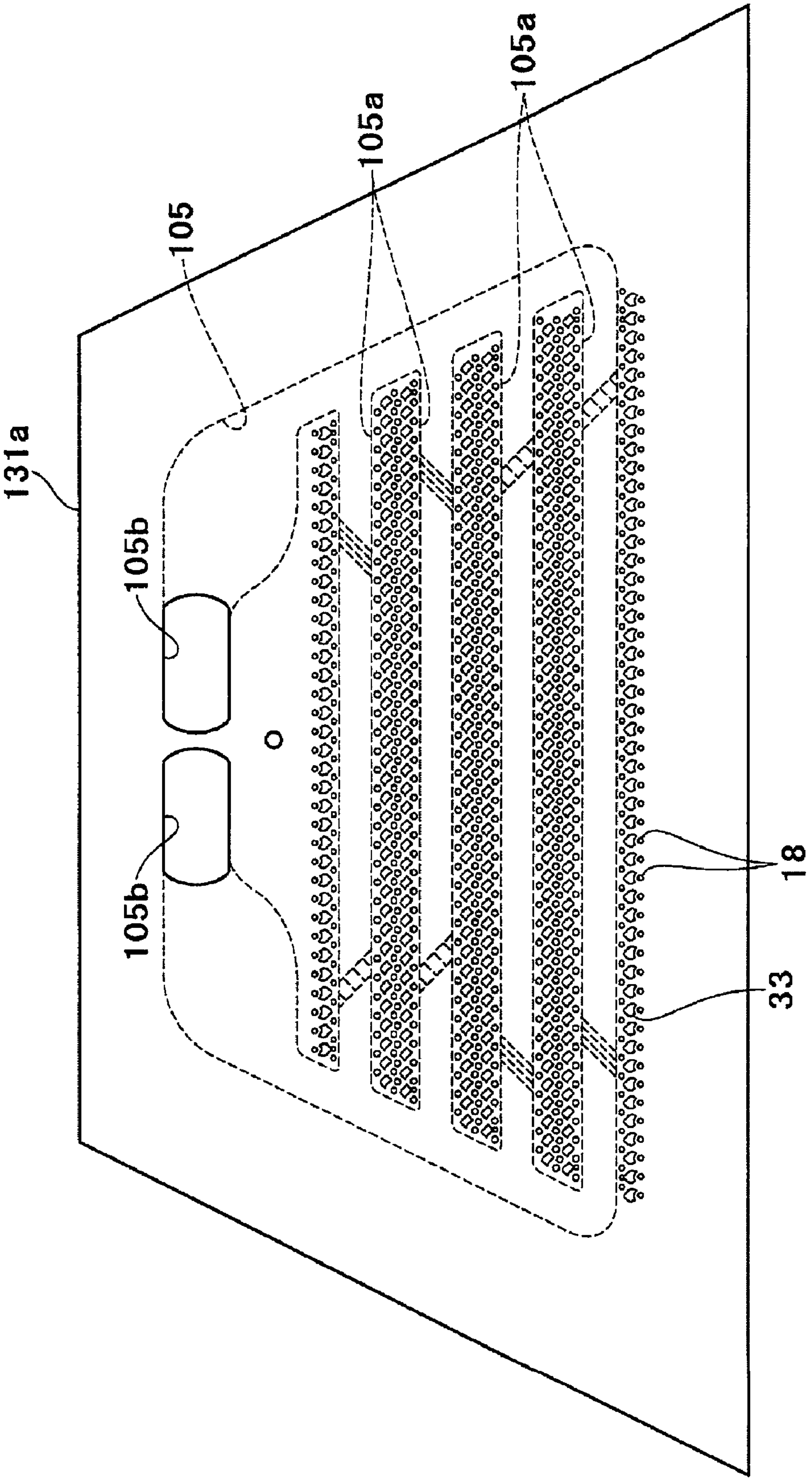
FIG. 14 is a plan view of a passage module according to a modified example.

In regard to the base portion onto which the plurality of passage modules 31*a* are assembled, although the manifold passages 105, communicating with the sub manifold passages 105*a* inside the respective passage modules 31*a*, are formed in the inside of the substrate 31*b* according to the above-described embodiment, such passages do not have to be formed. For example, as shown in FIG. 14, one passage module 131*a* may have the openings 105*b* and the manifold passage 105 in addition to the above-described passage configuration. In this case, there is no need to form the openings 105*b* and the manifold passages 105 in the substrate 31*b*, and the substrate 31*b* functions as a supporting member that supports the respective passage modules 131*a*.

Also, although the passage modules 31*a* are assembled into the openings formed in the substrate 31*b* in the above-described embodiment, the passage modules 31*a* may be assembled not into openings but into recesses formed in the substrate 31*b*, onto the upper surface of the substrate 31*b*, etc., instead.

An example of an embodiment where recesses are formed in the substrate 31*b* and the passage modules are assembled into the respective recesses shall now be described. Here, for example, just the portion of the plates 22 to 25 in FIG. 5 shall be the passage module. In these passage modules, portions of the individual ink passages 32 formed by the plates 22 to 25 (that is, the portions each made up of the passage from the exit of the sub manifold passage 105*a* to the pressure chamber 33, the pressure chamber 33, and a passage of an upper half portion from the pressure chamber 33 to the ejection port 18) are formed. The substrate 31*b* includes the plates 22 to 25 (upper laminate) and the plates 26 to 30 (lower laminate), through holes for assembling and housing the passage modules are formed in the plates 22 to 25 (upper laminate), and a common ink passage spanning across all head modules 10*x* (a passage leading from the openings 105*b* to the sub manifold passages 105*a* through the manifold passages 105) and passages of lower half portions from the pressure chambers 33 to the ejection ports 18 are formed in the plates 26 to 30 (lower laminate). In the state where the upper and lower laminates are laminated to each other, the recesses for assembling the passage modules are arranged from the through holes formed in the plates 22 to 25 (upper laminate). The sub manifold passages 105*a* open to bottom surfaces of the recesses (upper surface of the plate 26). In this example, the ranking of the passage modules is performed based on the magnitude of the passage resistance of the apertures 34. In this example, the passage modules are housed substantially completely in the recesses of the substrate in a mode where the passage modules are hardly exposed to the outside, and thus a force cannot readily be applied directly to the passage modules from the outside. The falling off, etc., of the head module is thus prevented. Also, as another example, the portion of the plates 22 to 24 in FIG. 5 may be arranged as the passage modules. In this case, the number of parts of each passage module is low and manufacture is facilitated.

Further, an example of assembling passage modules onto the upper surface of the substrate 31*b* shall be described. For example, the portions of the plates 22 to 24 in FIG. 5 are arranged as the passage modules and the portion of the plates 25 to 30 is arranged as the substrate. In the passage modules in this case are formed portions of the individual ink passages 32 formed by the plates 22 to 24 (that is, a portion made up of each of the passage from the aperture 34 to the pressure chamber 33, the pressure chamber 33, and a passage of an upper half portion from the pressure chamber 33 to the ejection port 18 differing from the abovementioned upper half portion). On the upper surface of the substrate 31*b* (the upper surface of the plate 25 in the present example), the openings 105*b* are formed, and holes joining the sub manifold passages 105*a* and the apertures 34 and passages of lower half portions from the pressure chambers 33 to the ejection ports 18 differing from the abovementioned lower half portions are opened. Passages formed by the plates 25 to 30 of FIG. 5 (that is, a common ink passage spanning across all head modules 10*x* (i.e. a passage leading from the openings 105*b* up to points before the aperture 34 through the manifold passages 105 and the sub manifold passages 105*a*) and passages of lower half portions differing from the abovementioned lower half portions) are formed inside of the substrate. The ranking of the passage modules is performed based on the magnitude of the passage resistance of the apertures 34 in this example as well.

Figure 12:
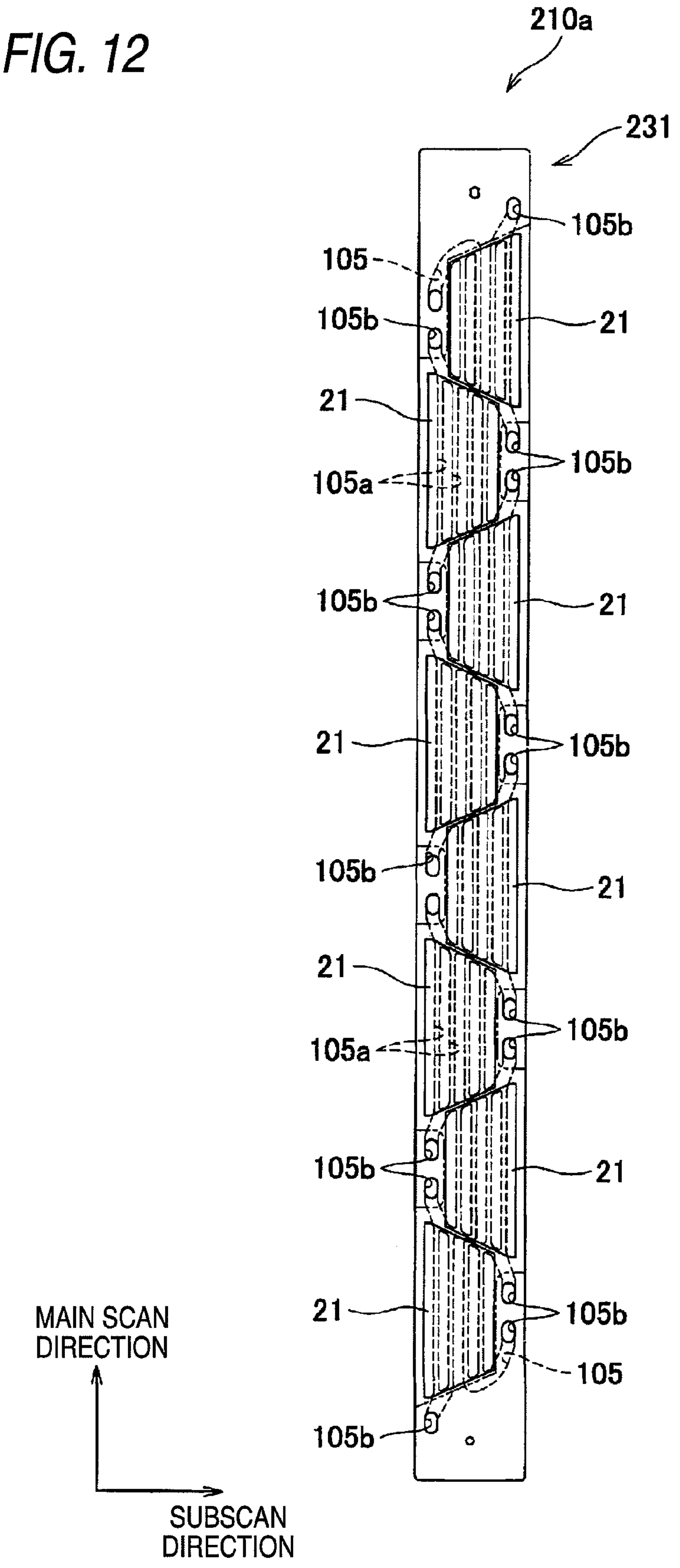
FIG. 12 is a plan view, corresponding to FIG. 3, of a main head body of an inkjet head according to another exemplary embodiment of the present invention.

Although, in the above-described embodiment, the passage unit 31 (see FIG. 3) includes the substrate 31*b* and the eight passage modules 31*a* made up of mutually independent members assembled onto the substrate 31*b*, the passage unit 31 is not restricted thereto. For example, as shown in FIG. 12, in another embodiment according to the present invention, a passage unit 231 included in a main head body 210*a* is not arranged by assembling the separately prepared substrate 31*b* and the eight passage modules 31*a* as in the above-described passage unit 31 but is arranged by laminating and adhering together a plurality of rectangular plates that are long in the main scan direction (plates having the same outer shape as the plates making up the substrate 31*b* in the above-described embodiment). Passages leading from the manifold passages 105 to the ejection ports 18 of the respective individual ink passages 32 are formed inside the laminate of the plates. With the present embodiment, adhesion portions of the actuator modules 21 in the passage unit 231 (trapezoidal portions shown in FIG. 12) correspond to being the passage modules.

Figure 13:
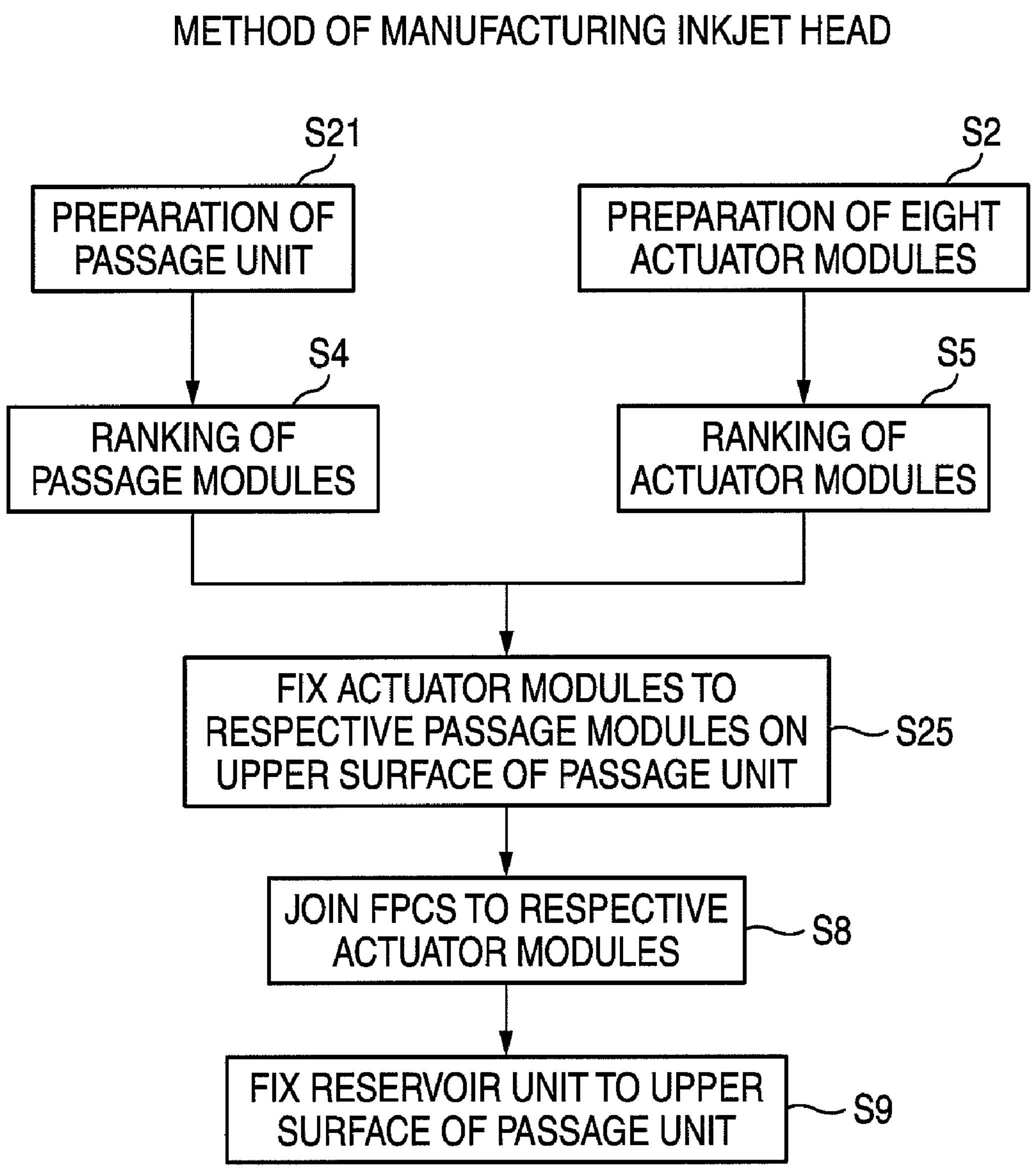
FIG. 13 is a process diagram, corresponding to FIG. 7, of an example of a method of manufacturing an inkjet head according to the other exemplary embodiment of FIG. 12.

A head having the passage unit 231 of FIG. 12 is manufactured, for example, through steps shown in FIG. 13. Steps that are the same as the steps shown in FIG. 7 shall be provided with the same reference numbers and description thereof shall be omitted. First, the passage unit 231 and the eight actuator modules 21 are prepared separately (S21 and S2). Here, in S21, before joining the plurality of plates that make up the passage unit 231, the parameters (dimensions of predetermined portions of the individual ink passages 32, etc.), used in computing the magnitudes of passage resistances in the subsequently performed ranking step (S4), are measured as in S1 described above. Then, after performing the ranking of the passage modules (S4) and the ranking of the actuator modules (S5) in the same manner as in the above-described embodiment, the actuator modules 21 are fixed to the respective passage modules (trapezoidal portions shown in FIG. 12) on the upper surface of the passage unit 231 based on the ranking results (S25). Further thereafter, through the same steps S8, S9, etc., as the above-described embodiment, the head according to the present embodiment is completed.

One driver IC 81 may be provided for a plurality of the actuator modules 21 instead of providing one each for each of the eight actuator modules 21.

Further, the passage modules and the actuator modules are not restricted to being respectively aligned along the longitudinal direction of the head and may instead be aligned along the width direction of the head. Also, the planar shapes of the passage modules and the actuator modules are not restricted to trapezoidal and may be, for example, parallelogram, triangular, square, rectangular, etc.

The number of liquid ejection heads included in the recording apparatus is not restricted to four and suffices to be not less than two. Alternatively, in each of the plurality of liquid ejection heads included in the recording apparatus, it suffices that there be not less than one each of the passage module and the actuator module. For example, in a recording apparatus that includes two heads, each having one passage module and one actuator module, the ranking is performed among the two heads.

The liquid ejection head according to the present invention may be a head that ejects a liquid other than ink, and is applicable to a thermal, dot impact, or other system besides an inkjet system, and is also applicable to a facsimile and copy machines, etc., in addition to being applicable to a printer.

Also, the liquid ejection head according to the present invention is also applicable to both line type and serial type recording apparatuses.

What is claimed is:

1. A method of manufacturing a liquid ejection head having:

a plurality of passage modules, each passage module including a plurality of individual passages, each individual passage leading through a pressure chamber to a liquid ejection port that ejects a liquid;

a plurality of actuator modules, each actuator module including a plurality of actuators respectively applying pressure to the liquid in the plurality of pressure chambers in each passage module; and a drive unit, which is thermally coupled to the passage modules and which supplies a drive voltage to the actuator modules corresponding to the passage modules;

the method of manufacturing a liquid ejection head comprising:

ranking the passage modules based on a magnitude of a passage resistance of the individual passages of the respective passage modules;

ranking the actuator modules based on a magnitude of a capacitance of the actuators of the respective actuator modules; and fixing the actuator modules to the passage modules so that the actuator modules that were ranked in the actuator module ranking as actuator modules in which the actuators have a capacitance not less than a predetermined capacitance correspond to the passage modules that were ranked in the passage module ranking as passage modules in which the individual passages have a passage resistance not less than a predetermined passage resistance, and so that the actuator modules that were ranked in the actuator module ranking as actuator modules in which the actuators have a capacitance less than the predetermined capacitance correspond to the passage modules that were ranked in the passage module ranking as passage modules in which the individual passages have a passage resistance less than the predetermined passage resistance.

2. The method of manufacturing the liquid ejection head according to claim 1, further comprising:

preparing a passage unit including the plurality of passage modules, which are each made up of mutually independent members, by assembling the plurality of passage modules onto one base portion.

3. The method of manufacturing the liquid ejection head according to claim 1, wherein a dimension of a throttle portion, which is a constricting passage provided in each individual passage to adjust a flow rate of the liquid supplied to the pressure chamber, is used as a factor to determine the magnitude of the passage resistance when ranking the passage modules.

4. The method of manufacturing the liquid ejection head according to claim 1, wherein a dimension of the liquid ejection port is used as a factor to determine the magnitude of the passage resistance when ranking the passage modules.

5. The method of manufacturing the liquid ejection head according to claim 1, wherein one drive unit is provided for each of the plurality of actuator modules.

6. The method of manufacturing the liquid ejection head according to claim 5, further comprising aligning the passage modules and the actuator modules respectively along a longitudinal direction of the liquid ejection head and aligning a plurality of the drive units along the longitudinal direction of the liquid ejection head so as to respectively correspond to the plurality of passage modules.

7. The method of manufacturing the liquid ejection head according to claim 1, wherein the ranking of the passage modules is performed based on the passage resistance of a portion of the plurality of individual passages in the passage module.

8. The method of manufacturing the liquid ejection head according to claim 1, wherein the ranking of the actuator modules is performed based on the capacitance of a portion of the plurality of actuators in the actuator module.

9. The method of manufacturing the liquid ejection head according to claim 8, wherein the portion of the actuators used in the actuator module ranking corresponds to the portion of the plurality of individual passages in the passage module used in the passage module ranking.

10. The method of manufacturing the liquid ejection head according to claim 1, wherein the plurality of passage modules and the plurality of actuator modules are ranked into not less than three ranks.

11. The method of manufacturing the liquid ejection head according to claim 10, wherein the plurality of passage modules and the plurality of actuator modules are ranked into the four ranks of first, second, third, and fourth ranks successively starting with lowest passage resistance and lowest capacitance in the passage module ranking and the actuator module ranking, respectively, and wherein during the actuator module fixing, the actuator modules are fixed to the passage modules so that the actuator modules ranked in the first or the second rank correspond to the passage modules ranked in the first or the second rank, the actuator modules ranked in the second or the third rank correspond to the passage modules ranked in the second or the third rank, and the actuator modules ranked in the third or the fourth rank correspond to the passage modules ranked in the third or the fourth rank.

12. A method of manufacturing a recording apparatus including a plurality of liquid ejection heads, each liquid ejection head having:

not less than one passage module, each passage module including a plurality of individual passages, each individual passage leading through a pressure chamber to a liquid ejection port that ejects a liquid;

not less than one actuator module, each actuator module including a plurality of actuators respectively applying pressure to the liquid in the plurality of pressure chambers in the passage module; and a drive unit, which is thermally coupled to the passage modules and which supplies a drive voltage to the actuator module corresponding to the passage module;

the method of manufacturing comprising:

ranking the passage modules, in the plurality of liquid ejection heads, based on a magnitude of a passage resistance of the individual passages of the respective passage modules;

ranking the actuator modules based on a magnitude of a capacitance of the actuators of the respective actuator modules; and fixing the actuator modules to the passage modules so that the actuator modules that were ranked in the actuator module ranking step as actuator modules in which the actuators have a capacitance not less than a predetermined capacitance correspond to the passage modules that were ranked in the passage module ranking step as passage modules in which the individual passages have a passage resistance not less than a predetermined passage resistance, and such that the actuator modules ranked in the actuator module ranking step as actuator modules in which the actuators have a capacitance less than the predetermined capacitance, correspond to the passage modules that were ranked in the passage module ranking step as passage modules in which the individual passages have a passage resistance less than the predetermined passage resistance.

13. The method of manufacturing the recording apparatus according to claim 12, further comprising: preparing, for each liquid ejection head, a passage unit including the plurality of passage modules, which are each made up of mutually independent members, by assembling the plurality of passage modules onto one base portion.

14. The method of manufacturing the recording apparatus according to claim 12, wherein a dimension of a throttle portion, which is a constricting passage provided in each individual passage to adjust a flow rate of the liquid supplied to the pressure chamber, is used as a factor to determine the magnitude of the passage resistance when ranking passage modules.

15. The method of manufacturing the recording apparatus according to claim 12, wherein a dimension of the liquid ejection port is used as a factor to determine the magnitude of the passage resistance when ranking the passage modules.

16. The method of manufacturing the recording apparatus according to claim 12, wherein one drive unit is provided for each of the plurality of actuator modules.

17. The method of manufacturing the recording apparatus according to claim 16, further comprising, for each liquid ejection head, aligning the passage modules and the actuator modules respectively along a longitudinal direction of the liquid ejection head and aligning a plurality of the drive units along the longitudinal direction of the liquid ejection head so as to respectively correspond to the plurality of passage modules.

18. The method of manufacturing the recording apparatus according to claim 12, wherein the ranking of the passage modules is performed based on the passage resistance of a portion of the plurality of individual passages in the passage module.

19. The method of manufacturing the recording apparatus according to claim 12, wherein the ranking of the actuator modules is performed based on the capacitance of a portion of the plurality of actuators in the actuator module.

20. The method of manufacturing the recording apparatus according to claim 19, wherein the portion of the actuators used in the actuator module ranking corresponds to the portion of the plurality of individual passages in the passage module used in the passage module ranking.

21. The method of manufacturing the recording apparatus according to claim 12, wherein the plurality of passage modules and the plurality of actuator modules are ranked into not less than three ranks.

22. The method of manufacturing the recording apparatus according to claim 21, wherein the plurality of passage modules and the plurality of actuator modules are ranked into the four ranks of first, second, third, and fourth ranks successively starting with from lowest passage resistance and lowest capacitance in the passage module ranking and the actuator module ranking, and wherein during the actuator module fixing, the actuator modules are fixed to the passage modules so that the actuator modules ranked in the first or the second rank correspond to the passage modules ranked in the first or the second rank, the actuator modules ranked in the second or the third rank correspond to the passage modules ranked in the second or the third rank, and the actuator modules ranked in the third or the fourth rank correspond to the passage modules ranked in the third or the fourth rank.

* * * * *